(12) United States Patent
Dinh et al.

(10) Patent No.: US 6,633,683 B1
(45) Date of Patent: Oct. 14, 2003

(54) APPARATUS AND METHOD FOR ADAPTIVELY REDUCING NOISE IN A NOISY INPUT IMAGE SIGNAL

(75) Inventors: Chon Tam Le Dinh, Mtl (CA); Cong Toai Kieu, St. Laurent (CA); Ha Do Viet, Montréal (CA)

(73) Assignee: Miranda Technologies Inc. (CA)

( * ) Notice: Subject to any disclaimer, the term of this patent is extended or adjusted under 35 U.S.C. 154(b) by 632 days.

(21) Appl. No.: 09/603,364

(22) Filed: Jun. 26, 2000

(51) Int. Cl.[7] .......................... G06K 9/40; G09G 5/00; H04N 7/00; H04N 5/21; H04N 1/38
(52) U.S. Cl. .................. 382/260; 382/261; 382/264; 382/265; 345/611; 345/618; 345/631; 348/466; 348/606; 358/452; 358/463
(58) Field of Search ............................... 382/190, 209, 382/210, 211, 217, 218, 219, 252, 255, 260, 261, 262, 263, 264, 265, 266, 269, 272, 273, 274, 275, 278, 282, 284, 286, 287, 294, 309, 310; 345/611, 613, 616, 617, 618, 631; 348/466, 606, 610, 625; 358/3.05, 461, 452, 453, 463, 512

(56) References Cited

U.S. PATENT DOCUMENTS

| | | | |
|---|---|---|---|
| 4,163,258 A | | 7/1979 | Ebihara et al. |
| 4,334,244 A | * | 6/1982 | Chan et al. .................. 348/606 |
| 4,503,461 A | * | 3/1985 | Nishimura ................ 378/98.12 |
| 4,523,230 A | | 6/1985 | Carlson et al. |
| 5,140,463 A | * | 8/1992 | Yoo et al. .................... 359/559 |
| 5,161,018 A | | 11/1992 | Matsunaga |
| 5,191,419 A | | 3/1993 | Wischermann |
| 5,260,775 A | | 11/1993 | Farouda |
| 5,272,533 A | * | 12/1993 | Akiyama et al. ........... 348/607 |
| 5,404,179 A | | 4/1995 | Hamasaki |
| 5,442,462 A | * | 8/1995 | Guissin ...................... 358/463 |
| 5,499,057 A | * | 3/1996 | Kondo et al. ............... 348/607 |
| 5,499,111 A | * | 3/1996 | Sato et al. .................. 382/252 |

OTHER PUBLICATIONS

"The Digital Wetgate: A Third–Generation Noise Reducer", Wischerman, G., SMPTE Journal, Feb. 1996, pp. 95–100.
"Fundamentals of Electronic Image Processing", Weeks; A.R. Jr., SPIE Optical Engineering Press, Bellingham, Washington, 1996.
"Two–Dimensional Signal and Image Processing", Lim; J.S., Prentice–Hall, Englewood Cliffs, NJ, 1990.

* cited by examiner

*Primary Examiner*—Bhavesh M. Mehta
*Assistant Examiner*—Yosef Kassa
(74) *Attorney, Agent, or Firm*—Ogilvy Renault

(57) ABSTRACT

The basic configuration of Single local Adaptive Window Spatial Noise Reducer (SAW-SNR) is based on a preliminary de-noising low-pass filter followed by homogenous region segmentation to the considered pixel in a given local window. The configuration is composed also of an adaptive local mean estimator, an adaptive local statistic estimator which is preferably an economic standard deviation (SD) estimator and finally, a minimum-mean-square-error (MMSE) based de-noising technique. The proposed segmentation configuration outperforms existing spatial noise reducers in term of subjective and objective performances, in term of edge preservation, noise reduction in both homogenous regions or picture edges and Peak Signal to noise Ratio (PSNR). A second configuration in the form of a Parallel Multiple local Adaptive Window Spatial Noise Reducer (Parallel M-AW-SNR), is a combination of several basic configurations which implements different segmented windows. The M-AW-SNR, which is the less complex configuration for multiple spatial noise reducers, reduces further residual noise as compared to the basic configuration. A third configuration combines the basic configuration of SAW-SNR with a controllable noise variance estimator. This generic configuration allows an adaptive local control of noise reduction level, which can be useful for some correlated noise such as ringing noise in DCT-based decompressed images or cross-luminance noise in composite decoded images.

28 Claims, 9 Drawing Sheets

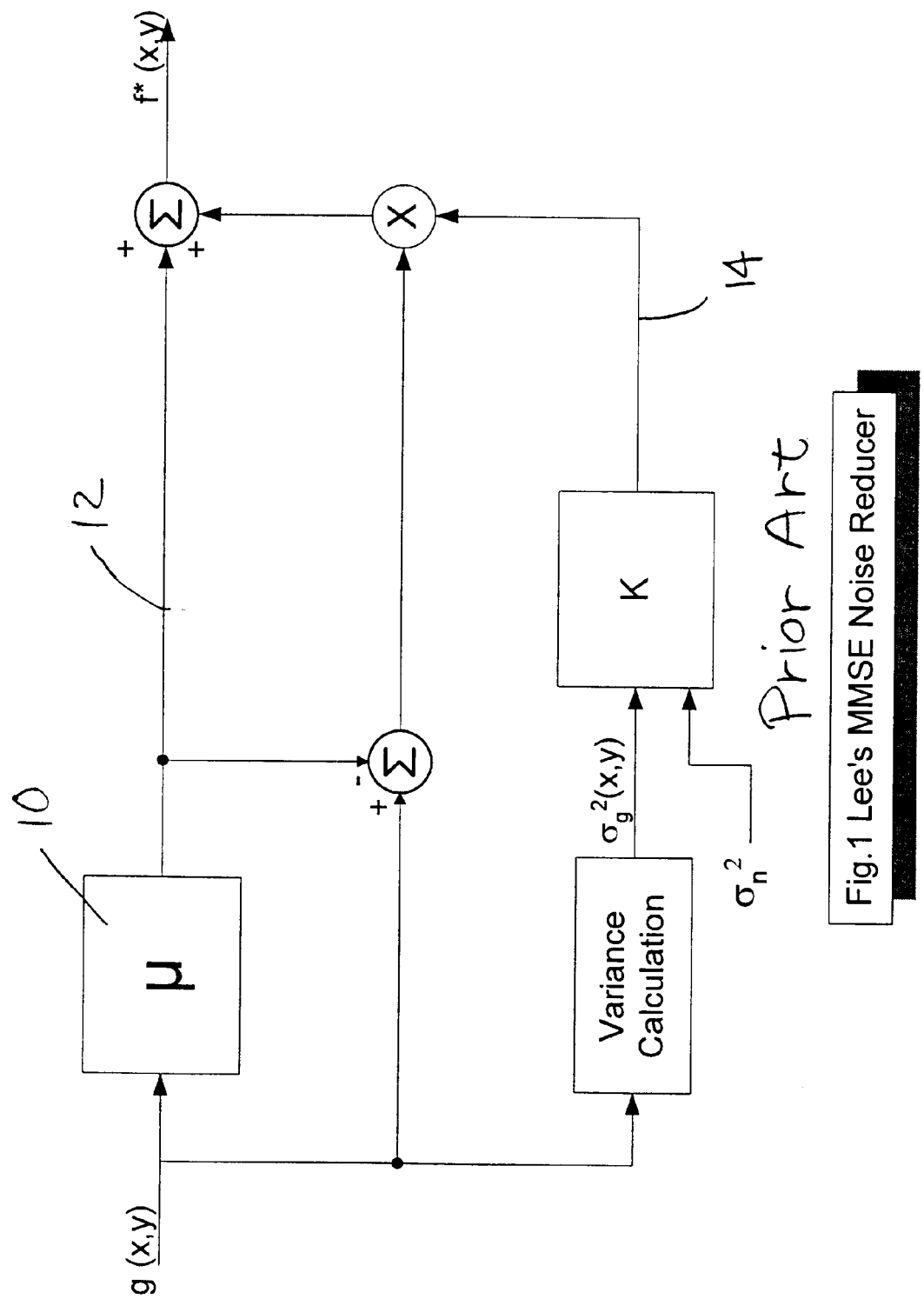
Fig.1 Lee's MMSE Noise Reducer Prior Art

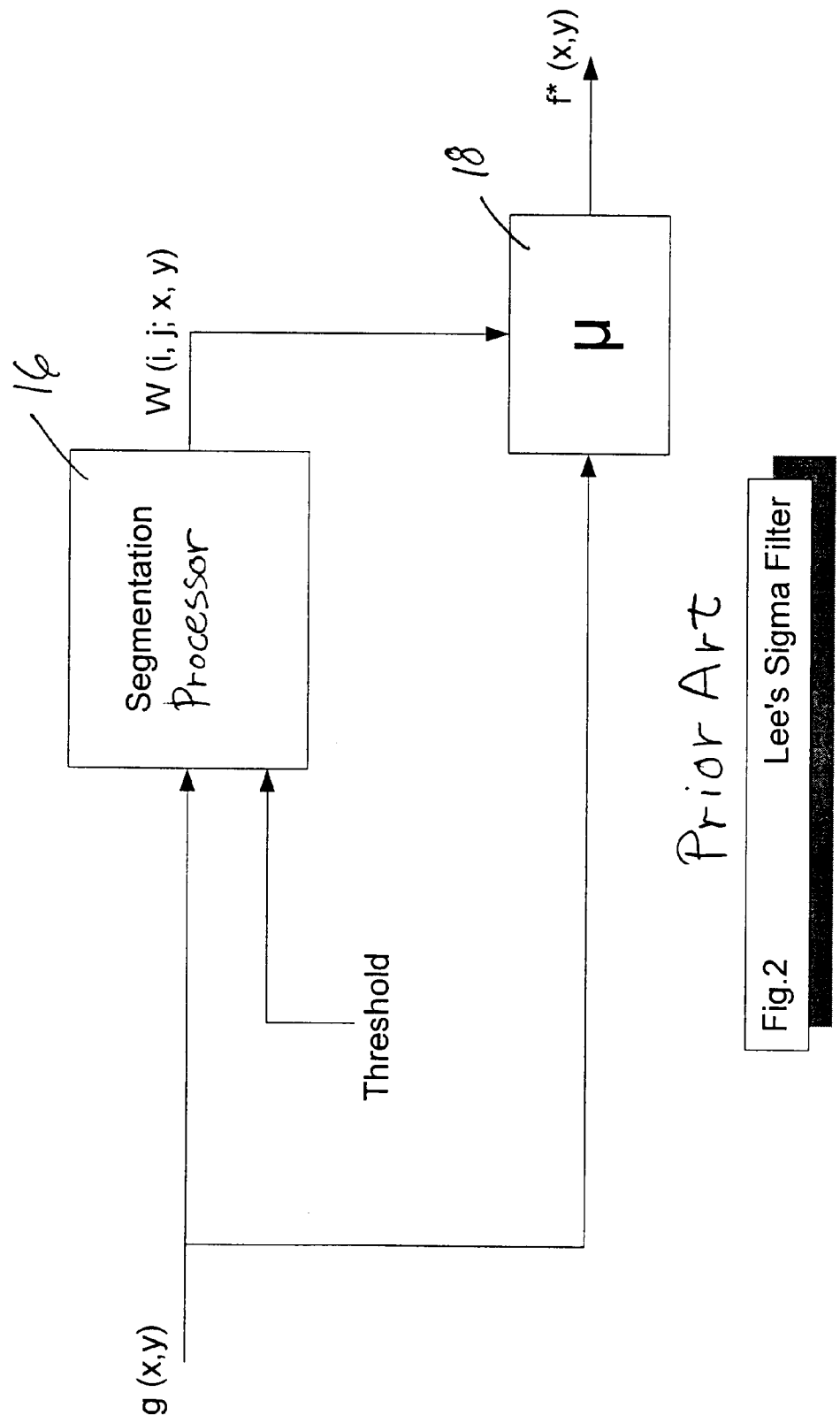

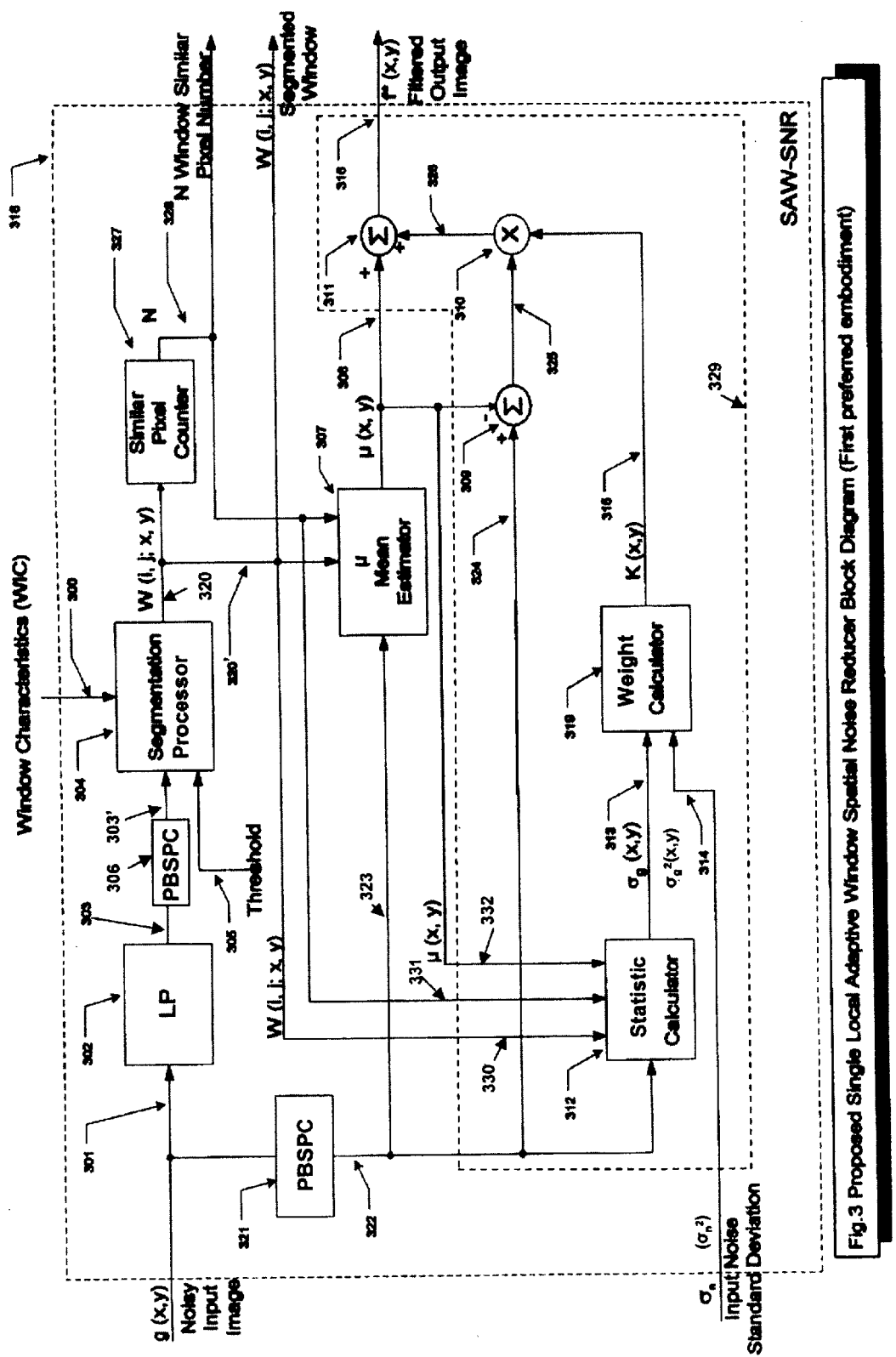
Fig. 3 Proposed Single Local Adaptive Window Spatial Noise Reducer Block Diagram (First preferred embodiment)

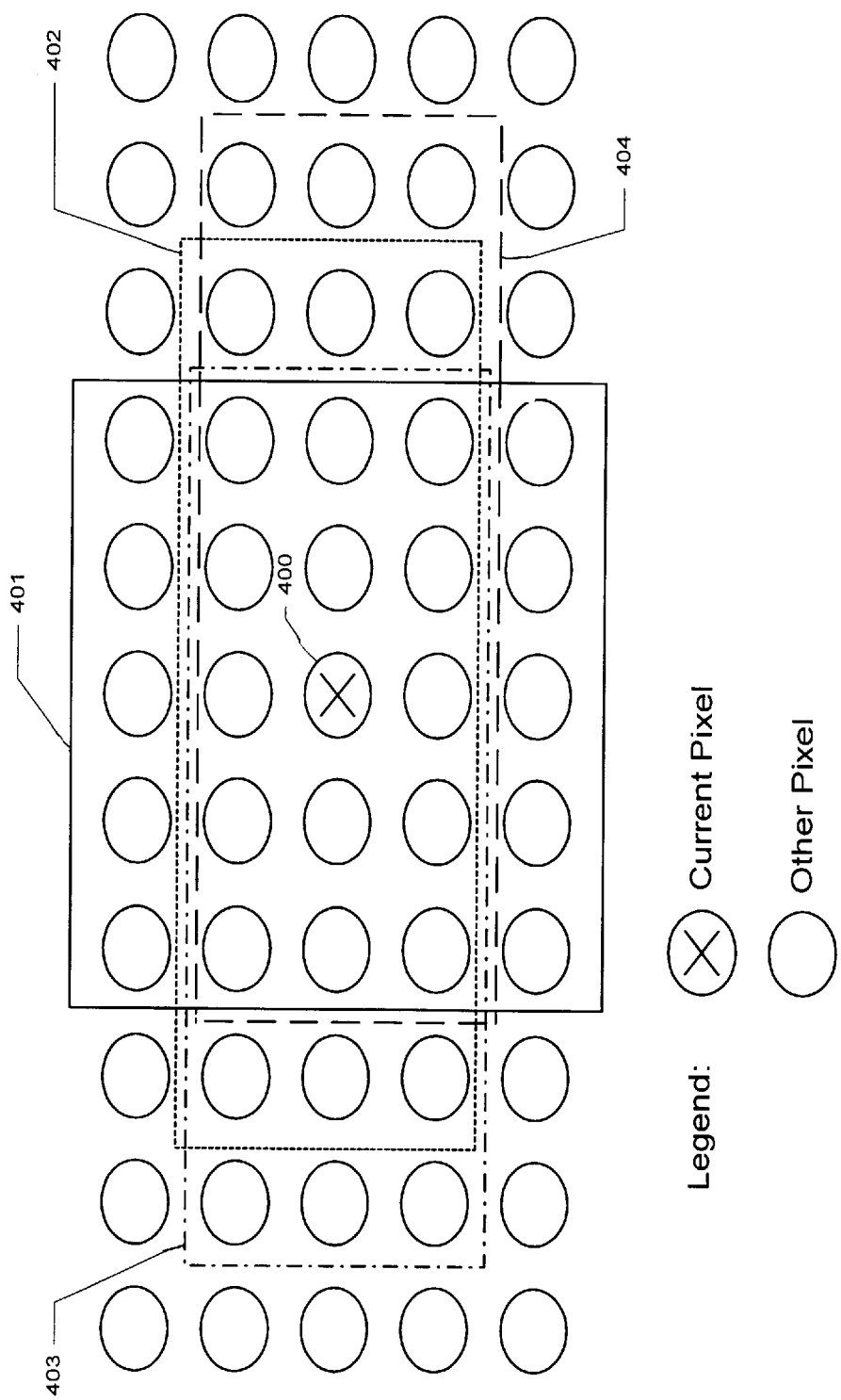

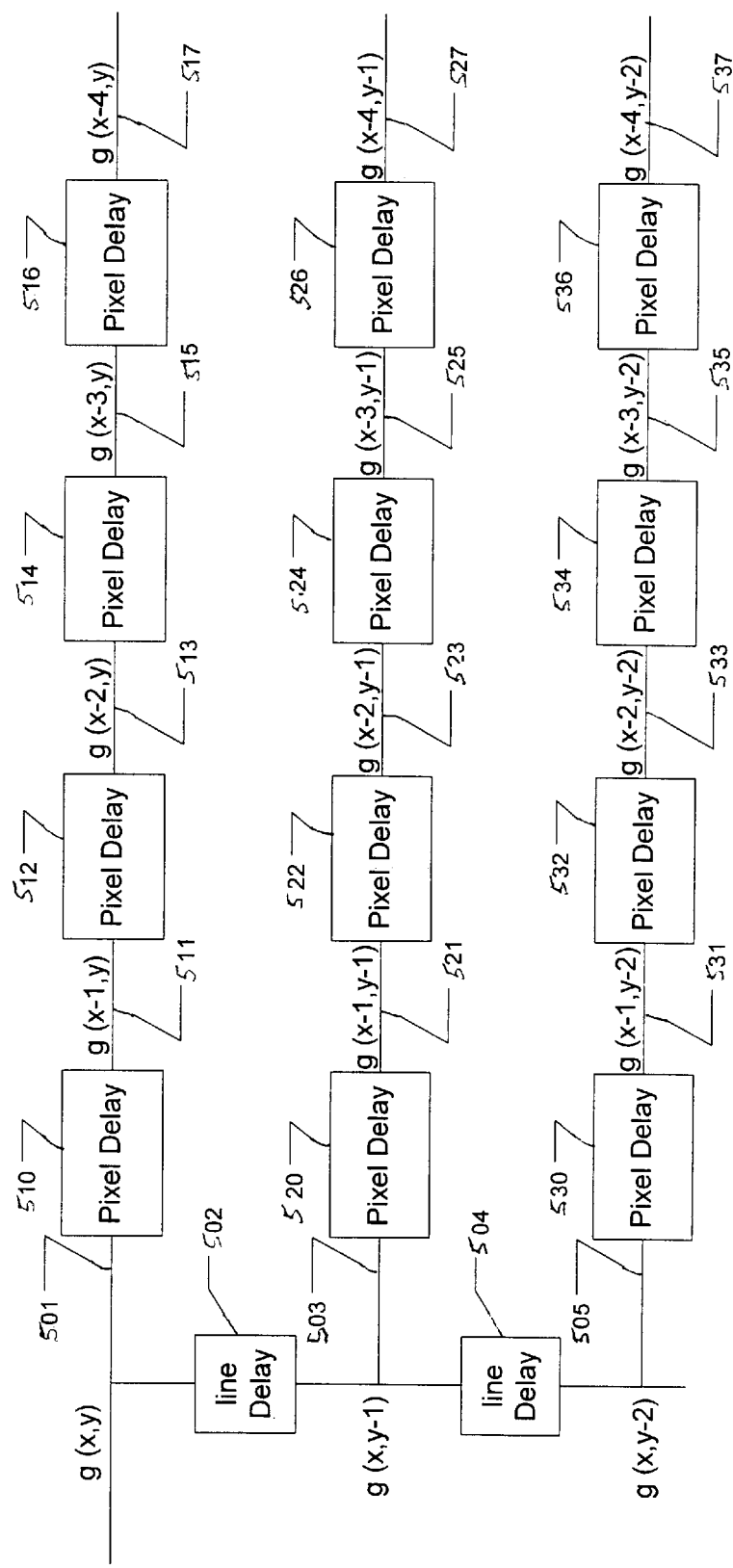
Fig. 5 Pixel based sequential to parallel converter (PB.SPC) for a window of 3x5

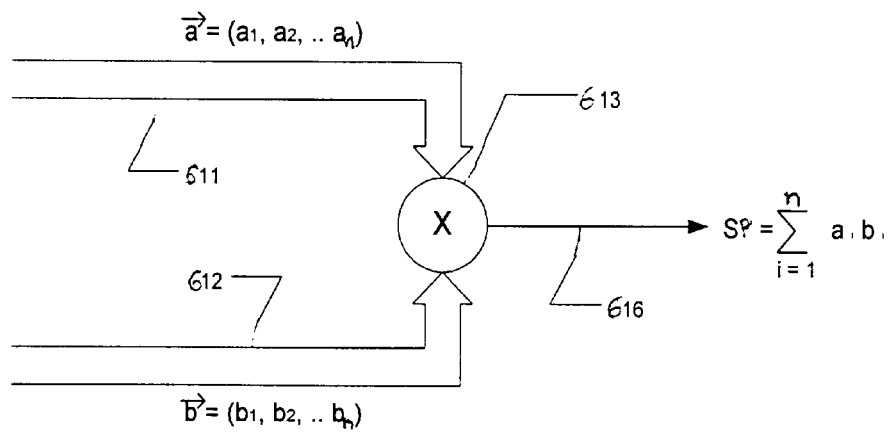
Fig. 6a Scalar Product Device / Notation
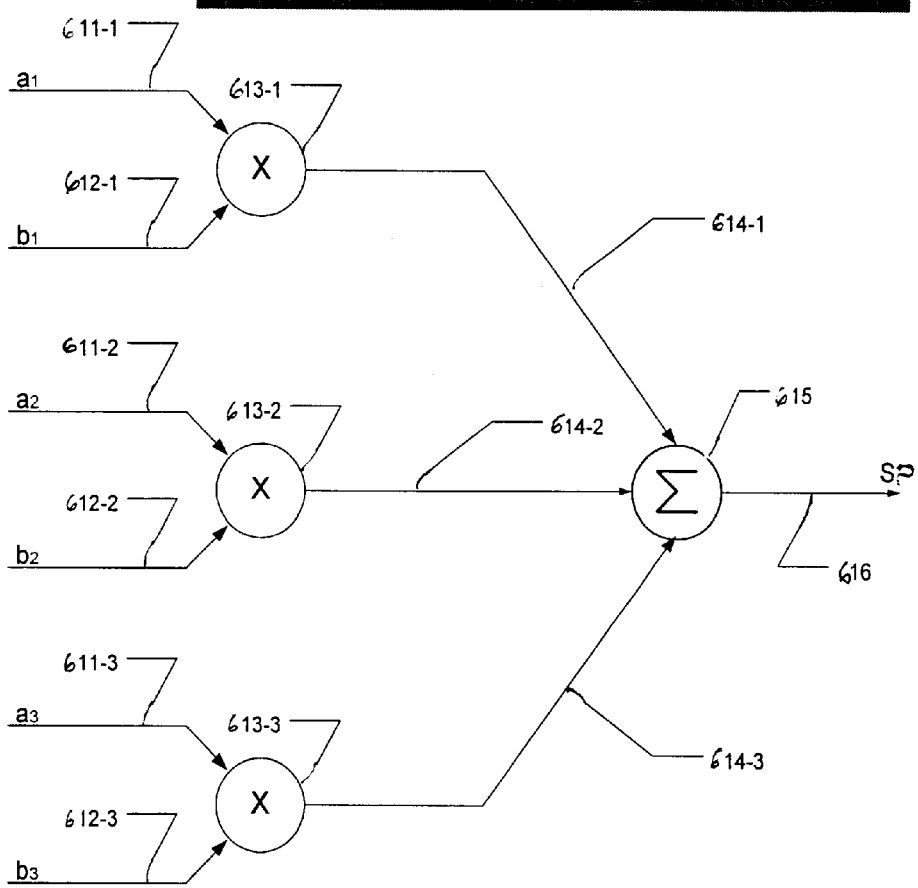
Fig. 6b Scalar Product Device Implementation

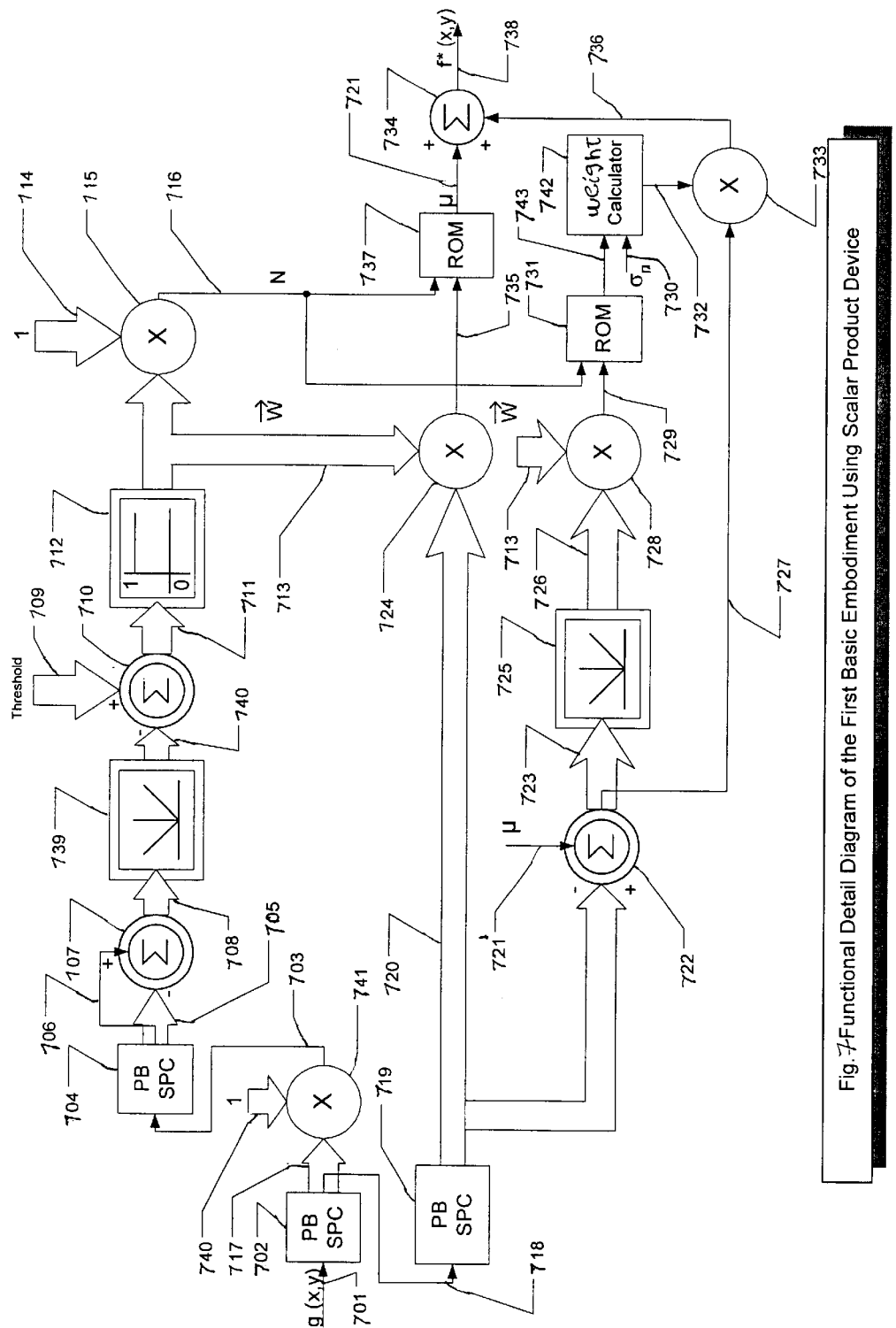
Fig. 7 Functional Detail Diagram of the First Basic Embodiment Using Scalar Product Device

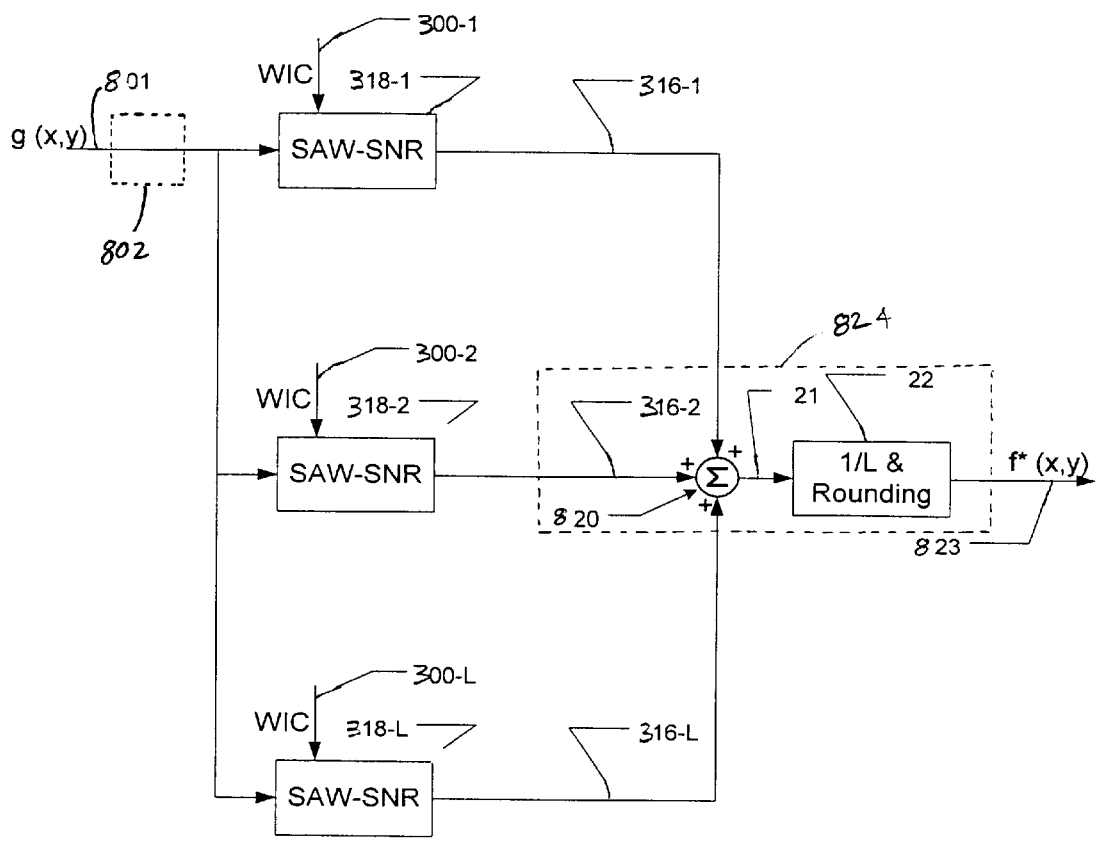
Fig. 8 Multiple Local Window Spatial Noise Reducer via Parallel SAW-SNRs (Second Preferred Embodiment)

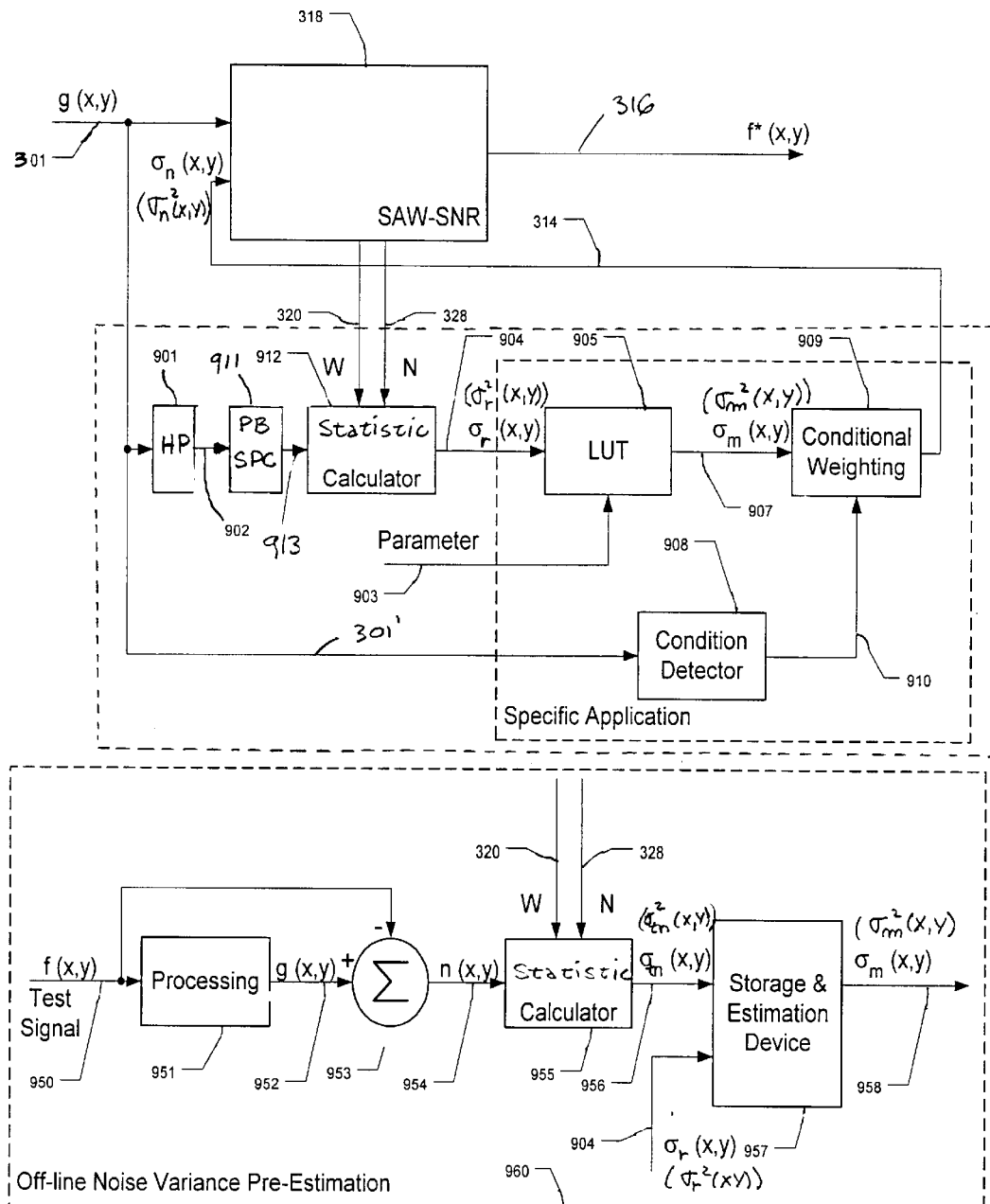
Fig.9 Proposed SAW-SNR with Controllable Noise Statistic Estimator Block Diagram (Third Preferred Embodiment)

APPARATUS AND METHOD FOR ADAPTIVELY REDUCING NOISE IN A NOISY INPUT IMAGE SIGNAL

FIELD OF THE INVENTION

The present invention relates to the field of image noise reducing, and more particularly to apparatus and method for adaptively reducing noise in a noisy input image or a sequence of images, wherein the noise is of an additive Gaussian type.

DESCRIPTION OF THE PRIOR ART

While existing prior patents and other publications on noise reducing techniques are abundant, they generally concern coring techniques applied in high frequency part of a considered image. Image de-noising techniques can be classified as spatial or temporal ones. Of course, a series combination of spatial and temporal techniques is possible and generally beneficial.

Temporal filters are generally applied for a sequence of images in which the noise component between two successive images is supposed to be non-correlated. The temporal filtering techniques are essentially based either on motion detection or motion estimation. The filter structure can be either infinite impulse response (IIR) or finite impulse response (FIR) with frame delay elements. In general, the temporal techniques are more performing than the spatial ones. The system cost is essentially due to the frame memory and the motion estimation hardware. Temporal de-noising techniques can be found, for example, in U.S. Pat. No. 5,161,018 to Matsugana; U.S. Pat. No. 5,191,419 to Wicshermann; U.S. Pat. No. 5,260,775 to Farouda; U.S. Pat. No. 5,404,179 to Hamasaki and in a recent publication entitled "*The Digital Wetgate: A Third-Generation Noise Reducer*", Wischerman; G., SMPTE Journal, February 1996, pp. 95–100.

Spatial noise reducing techniques can be applied for either still pictures or sequence of images. These techniques are described in many available textbooks such as: "*Fundamentals of Electronic Image Processing*", Weeks; A. R. Jr., SPIE Optical Engineering Press, Bellingham, Wash., 1996; "*Two-Dimensional Signal and Image Processing*", Lim; J. S., Prentice-Hall, Englewood Cliffs, N.J., 1990; and "*Nonlinear Digital Filters: Principles and Applications*", Pitas, J. and al., Kluwer Academic Publishers, Boston, 1990. In general, spatial noise reducing techniques can be divided further into three categories.

In the first category, the spatial nonlinear filters are based on local order statistics. Utilizing a local window around a considered pixel, these filters are working on this set of pixels ordered from their minimum to their maximum values. For example, the median filter, the min/max filter, the alpha-trimmed mean filter, and their respective variants can be classified in this category. These filters work well for removing impulse like salt-and-pepper noise. However, for the small amplitude noise these filters can blur some details or small edges.

In the second category the coring techniques are applied in another domain different from the original image spatial domain. The chosen domain partly depends on noise nature. U.S. Pat. No. 4,163,258 to Ebihara teaches the use of the Walsh-Hadamard transform domain, while U.S. Pat. No. 4,523,230 to Carlson et al. discloses some sub-band decomposition. Finally, the homomorphic filter, working in the logarithmic domain, is the classical one for removing multiplicative noise and shading from an image.

In the third category, the filters are locally adaptive and the noise removing capacity is varying from homogenous regions to edge regions. These filters give good results for additive Gaussian noise. A well-known filter in this category is the minimum-mean-square-error (MMSE) filter as originally published in "*Digital image enhancement and noise filtering by use of local statistics*", Lee; J. S., IEEE Trans. on PAMI-2, March 1980, pp. 165–168. Referring FIG. 1, a general block diagram of the prior art Lee's MMSE noise reducer is illustrated. Let a fixed dimension window centered on the considered or current pixel. The filtered pixel output f*(x,y) is additively composed of the local mean value obtained at output 12 of a mean estimator 10 and a weighted difference of the noisy pixel g(x,y) and the local mean intensity values. The optimum weight K determined by MMSE at an output 14, which corresponds to a kind of coring technique, is equal to the local variance ratio of the true image and the noisy one. The Lee's MMSE filter efficiently removes noise in homogenous image regions while reserving the image edges. However, the noise essentially remains in edge or near-edge regions. Moreover, the required variance calculation is expensive for hardware implementation.

In "*One-dimensional processing for adaptive image restoration*", Chan; P. et al., IEEE Trans. on ASSP-33, February 1985, pp. 117–126, there is presented a method for noise reducing in edge regions. The authors propose the use, in series, of four (4) one-dimensional MMSE filters respectively along 0°, 45°, 90° and 135° directions. The obtained results are impressive for large variance noise. However, for small noise, the filter can blur some image edges. Moreover, the noise variance output estimation at each filter stage require costly hardware.

For a same purpose, in "*Digital image smoothing and the Sigma filter*", Lee; J. S., Computer Vision, Graphics, and Image Processing-24, 1983, pp. 255–269, there is proposed a said Sigma filter as illustrated in FIG. 2. For noise removing, this filter calculates with a segmentation processor 16 using a local window of 5x5 dimensions combined to a mean estimator 18, the mean value of similar pixel intensities to that of a central considered pixel g(x,y), to obtain f*(x,y). A pixel in the window is said similar to the considered pixel if the intensity difference between these two pixels is smaller than a given threshold value. Usually, the threshold value is set equal to twice the noise standard deviation. For small noise, the Sigma filter works well, except for some pixels with sharp spot noise. For the latter case, J. S. Lee has suggested also, in a heuristic manner, the use of immediate neighbor average at the expense of some eventually blurred picture edges. Generally, the MMSE filters yield better objective results in term of peak signal to noise ratio (PSNR), than the Sigma filter.

Independently to the Lee's contribution, U.S. Pat. No. 4,573,070 to Cooper essentially discloses a Sigma filter for a 3x3 window. Moreover, in the same Patent, Cooper finally combines in a single configuration the said Sigma filter, an order statistic filter and a strong impulse noise reduction filter.

In the above-cited publication of A. R. Weeks Jr., there is described the adaptive double-window-modified-trimmed mean (DW-MTM) filter. This filter yields as output the trimmed mean value of similar pixel intensities to the median value in a local window. The adaptive DW-MTM filter is able to eliminate both salt-and-pepper noise and Gaussian noise but at the expense of filtered image blurring.

Finally, for correlated noise such as ringing/quantified noise in Discrete-Cosine-Transform (DCT) based decompressed image or cross-luminance noise in NTSC/PAL decoded image, there is still a need for a generic configuration or technique for implementing a real time noise reducer.

SUMMARY OF THE INVENTION

It is therefore an object of the present invention to provide an apparatus and a method for adaptively reducing noise in a noisy input image signal which provides spatial noise reduction in both homogenous and edge regions using a robust adaptive local segmented window, while preserving picture edges.

Another object of an aspect of the present invention is to provide, via a local segmented window, a technique that can adaptively estimate local mean and local standard deviation or variance in a non-stationary environment of a picture.

Yet another object of an aspect of the present invention is to provide an economic MMSE-based spatial noise reducer.

Yet another object of an aspect of the present invention is to provide a combined spatial noise reducer in which multiple local segmented windows are considered.

Yet another object of an aspect of the present invention is to provide a generic configuration for correlated noise variance estimator and for controllable mechanism of local noise reduction level.

According to one or more of the above objects, from a broad aspect of the present invention, there is provided an adaptive apparatus for spatially reducing noise in a noisy input image signal comprising a low-pass filter receiving the noisy input image signal to generate a noisy low-spatial frequency image signal. The apparatus further comprises a first pixel-based serial-to-parallel converter receiving the noisy low-spatial frequency image signal to generate a group of noisy low-spatial frequency image parallel signals associated with a locally considered pixel and according to predetermined pixels-window characteristics, a pixel-based local window segmentation processor comparing values of the noisy low-spatial frequency image parallel signals associated with pixels included within the window with the locally considered pixel value to generate segmented local window parallel signals associated with selected pixels, and a counter generating a selected-pixels count signal. The apparatus further comprises a second pixel-based serial-to-parallel converter receiving the noisy input image signal to generate a group of noisy input image parallel signals associated with the locally considered pixel and according to the predetermined pixels-window characteristics. The apparatus also comprises a mean estimator combining the noisy input image parallel signals with the segmented local window parallel signals and the selected-pixels count signal to generate a mean pixel value signal associated with the locally considered pixel, and a minimum-mean-square-error filter receiving the noisy input image parallel signals, the segmented local window parallel signals, the selected-pixels count signal and the mean pixel value signal to generate a noise-filtered output image signal according to an input noise statistic signal.

According to a further broad aspect of the invention, there is provided a an adaptive apparatus for spatially reducing noise in a noisy input image signal comprising a plurality of parallel-connected adaptive spatial noise reducers each presenting a distinct set of predetermined pixels-window characteristics, each said noise reducer receiving the noisy input image signal to generate a corresponding pre-filtered output image signal and an averaging unit receiving each pre-filtered output image signal at a corresponding positive input thereof to generate a noise-filtered output image signal. Each noise reducer comprises a low-pass filter receiving the noisy input image signal to generate a noisy low-spatial frequency image signal and a first pixel-based serial-to-parallel converter receiving the noisy low-spatial frequency image signal to generate a group of noisy low-spatial frequency image parallel signals associated with a locally considered pixel and according to the set of predetermined pixels-window characteristics. Each noise reducer further comprises a pixel-based local window segmentation processor comparing values of the noisy low-spatial frequency image parallel signals associated with pixels included within the window with the locally considered pixel value to generate segmented local window parallel signals associated with selected pixels, a counter generating a selected-pixels count signal, and a second pixel-based serial-to-parallel converter receiving the noisy input image signal to generate a group of noisy input image parallel signals associated with the locally considered pixel and according to the set of predetermined pixels-window characteristics. Each noise reducer also comprises a mean estimator combining the noisy input image parallel signals with the segmented local window parallel signals and the selected-pixels count signal to generate a mean pixel value signal associated with the locally considered pixel, and a minimum-mean-square-error filter receiving the noisy input image parallel signals, the segmented local window parallel signals, the selected-pixels count signal and the mean pixel value signal to generate the pre-filtered output image signal according to an input noise statistic signal.

According to another broad aspect of the invention, there is provided an adaptive apparatus for spatially reducing noise in a noisy input image signal comprising an adaptive spatial noise reducer including a low-pass filter receiving the noisy input image signal to generate a noisy low-spatial frequency image signal, and a first pixel-based serial-to-parallel converter receiving the noisy low-spatial frequency image signal to generate a group of noisy low-spatial frequency image parallel signals associated with a locally considered pixel and according to a set of predetermined pixels-window characteristics. The adaptive spatial noise reducer further includes a pixel-based local window segmentation processor comparing values of the noisy low-spatial frequency image parallel signals associated with pixels included within the window with the locally considered pixel value to generate segmented local window parallel signals associated with selected pixels, a counter generating a selected-pixels count signal, and a second pixel-based serial-to-parallel converter receiving the noisy input image signal to generate a group of noisy input image parallel signals associated with the locally considered pixel and according to the set of predetermined pixels-window characteristics. The adaptive spatial noise reducer also includes a mean estimator combining the noisy input image parallel signals with the segmented local window parallel signals and the selected-pixels count signal to generate a mean pixel value signal associated with the locally considered pixel, and a minimum-mean-square-error filter receiving the noisy input image parallel signals, the segmented local window parallel signals, the selected-pixels count signal and the mean pixel value signal to generate a noise-filtered output image signal according to an input noise statistic signal. The apparatus further comprises a controllable noise statistic estimator including a high-pass two-dimensional filter receiving the noisy input image signal to generate a noisy horizontal/vertical high-spatial frequency image signal, and a third pixel-based serial-to-parallel converter receiving the noisy horizontal/vertical high-spatial frequency image signal to generate a group of noisy horizontal/vertical high-spatial frequency image parallel signals associated with the locally considered pixel and according to the set of predetermined pixels-window characteristics. The controllable noise statistic estimator further includes a statistic calculator combining the noisy horizontal/vertical high-spatial frequency image parallel signals with the segmented local window parallel signals and the selected-pixels count signal to generate a resulting noise statistic signal associated with the locally considered pixel, and a noise statistic estimator unit generating the input noise statistic signal from the resulting noise statistic signal.

According to another broad aspect of the invention, there is provided an adaptive method for spatially reducing noise in a noisy input image signal comprising the steps of: i) filtering the noisy input image signal to generate a noisy low-spatial frequency image signal; ii) converting the noisy low-spatial frequency image signal to a group of noisy low-spatial frequency image parallel signals associated with a locally considered pixel and according to a set of predetermined pixels-window characteristics; iii) comparing values of the noisy low-spatial frequency image parallel signals associated with pixels included within the window with the locally considered pixel value to generate segmented local window parallel signals associated with selected pixels; iv) generating a selected-pixels count signal; v) converting the noisy input image signal to a group of noisy input image parallel signals associated with the locally considered pixel and according to the set of predetermined pixels-window characteristics; vi) combining the noisy input image parallel signals with the segmented local window parallel signals and the selected-pixels count signal to generate a mean pixel value signal associated with the locally considered pixel; and vii) processing the noisy input image parallel signals with a minimum-mean-square-error filter using the segmented local window parallel signals, the selected-pixels count signal and the mean pixel value signal to generate a noise-filtered output image signal according to an input noise statistic signal.

According to another broad aspect of the invention, there is provided an adaptive method for spatially reducing noise in a noisy input image signal comprising the steps of: i) filtering the noisy input image signal to generate a noisy low-spatial frequency image signal; ii) converting the noisy low-spatial frequency image signal to a group of noisy low-spatial frequency image parallel signals associated with a locally considered pixel and according to a set of predetermined pixels-window characteristics; iii) comparing values of the noisy low-spatial frequency image parallel signals associated with pixels included within the window with the locally considered pixel value to generate segmented local window parallel signals associated with selected pixels; iv) generating a selected-pixels count signal; v) converting the noisy input image signal to a group of noisy input image parallel signals associated with the locally considered pixel and according to the set of predetermined pixels-window characteristics; vi) combining the noisy input image parallel signals with the segmented local window parallel signals and the selected-pixels count signal to generate a mean pixel value signal associated with the locally considered pixel; vii) processing the noisy input image parallel signals with a minimum-mean-square-error filter using the segmented local window parallel signals, the selected-pixels count signal and the mean pixel value signal to generate a pre-filtered output image signal according to an input noise statistic signal; viii) repeating said steps ii) to vii) according to at least one further complementary set of pixels-window characteristics to generate a further pre-filtered output image signal according to the input noise statistic signal; and ix) averaging said output image signals to generate a noise-filtered output image signal.

According to another broad aspect of the invention, there is provided an adaptive method for spatially reducing noise in a noisy input image signal comprising: i) filtering the noisy input image signal to generate a noisy low-spatial frequency image signal; ii) converting the noisy low-spatial frequency image signal to a group of noisy low-spatial frequency image parallel signals associated with a locally considered pixel and according to a set predetermined pixels-window characteristics; iii) comparing values of the noisy low-spatial frequency image parallel signals associated with pixels included within the window with the locally considered pixel value to generate segmented local window parallel signals associated with selected pixels; iv) generating a selected-pixels count signal; v) converting the noisy input image signal to a group of noisy input image parallel signals associated with the locally considered pixel and according to the set of predetermined pixels-window characteristics; vi) combining the noisy input image parallel signals with the segmented local window parallel signals and the selected-pixels count signal to generate a mean pixel value signal associated with the locally considered pixel; vii) filtering the noisy input image signal to generate a noisy horizontal/vertical high-spatial frequency image signal; viii) converting the noisy horizontal/vertical high-spatial frequency image signal to a group of noisy horizontal/vertical high-spatial frequency image parallel signals associated with the locally considered pixel and according to the set of predetermined pixels-window characteristics; ix) combining the noisy horizontal/vertical high-spatial frequency image parallel signals with the segmented local window parallel signals and the selected-pixels count signal to generate a resulting noise statistic signal associated with the locally considered pixel; x) generating an input noise statistic signal from the resulting noise statistic signal; and xi) processing the noisy input image parallel signals with a minimum-mean-square-error filter using the segmented local window parallel signals, the selected-pixels count signal and the mean pixel value signal to generate a noise-filtered output image signal according to the input noise statistic signal.

BRIEF DESCRIPTION OF THE DRAWINGS

The preferred embodiments of the present invention will now be described with reference to the accompanying drawings, in which:

FIG. 1 is a general block diagram of the prior art Lee's MMSE noise reducer;

FIG. 2 is a general block diagram of the prior art Lee's Sigma filter;

FIG. 3 is a block diagram illustrating a first preferred embodiment of a spatial noise reducer according to the invention, in which a single local adaptive window is utilized;

FIG. 4 illustrates some examples of window characteristics versus current pixel;

FIG. 5 is a block diagram representing a pixel-based sequential-to-parallel converter;

FIG. 6a is a graphic notation of a scalar product device;

FIG. 6b is a specific example of a scalar product device implementing two vectors each having three (3) components;

FIG. 7 illustrates a functional detailed diagram of the first basic embodiment of FIG. 1 using scalar product devices;

FIG. 8 is a general block diagram representing a second preferred embodiment of a spatial noise reducer according to the present invention, in the form of a parallel multiple local adaptive window spatial noise reducer;

FIG. 9 is a block diagram representing a third preferred embodiment of s spatial noise reducer according to the invention, which combines a single local adaptive window spatial noise reducer with a controllable noise variance estimator.

DETAILED DESCRIPTION OF THE PREFERRED EMBODIMENTS

Referring now to FIG. 3 a first embodiment of the present invention in the form of a Single local Adaptive Window Spatial Noise Reducer (SAW-SNR) will be described. This basic configuration provides a segmentation-based MMSE spatial noise reducer for efficient edge preservation, and noise reduction in both homogenous or edges picture regions. The configuration can be also considered as a suitable combination of the Sigma and the MMSE filters. In the block diagram shown in FIG. 3, appropriate delays allowing signal synchronization required by the various operations of the signal processing are not represented, implementation of such delays being well known in the art. An example of such an implementation will be described later in reference to FIG. 7. A noisy image input signal g(x,y) at 301, which is typically a luminance component of the image, is applied to the SAW-SNR generally designated at 318. The couple (x,y) represents the current coordinates of a considered pixel. The input signal g(x,y) is a noisy version of an original image f(x,y). A noise component n(x,y) is supposed to be additive, zero mean and independent to the original image, i.e.:

$$g(x,y)=f(x,y)+n(x,y). \quad (1)$$

The purpose of a noise reducer is to provide a cleaned output signal f*(x,y) which should be as close as possible to the original and unknown signal f(x,y). A usual criterion is the minimum of mean square error:

$$J=\min E((f(x,y)-f^*(x,y))^2) \quad (2)$$

in which the image output signal f*(x,y) is a linear combination of the noisy observed image input g(x,y) and a local constant value:

$$f^*(x,y)=a(x,y)\cdot g(x,y)+b(x,y). \quad (3)$$

Substituting equation (3) in equation (2) and minimizing the mean square error, the expression of f*(x,y) in equation (3) becomes:

$$f^*(x,y)=K(x,y)\cdot g(x,y)+(1-K(x,y))\cdot\mu(x,y) \quad (4a)$$

$$f^*(x,y)=\mu(x,y)+K(x,y)\cdot(g(x,y)-\mu(x,y)) \quad (4b)$$

wherein $\mu(x,y)$ is the local image mean value of f(x,y) or that of g(x,y) and the weight K(x,y) is determined by:

$$K(x,y)=\min(0,(\sigma_g^2(x,y)-\sigma_n^2))/(\sigma_g^2(x,y)). \quad (5)$$

In the latter equation, the symbol $\sigma_g(x,y)$ denotes the local standard deviation (SD) of the input image g(x,y), and $\sigma_n$ corresponds in turn to that of the noise signal n(x,y). Substituting these results into equation (2) yields the minimum value of the performance indices:

$$J=J^*=\sigma_f^2(x,y)\cdot\sigma_n^2/(\sigma_f^2(x,y)+\sigma_n^2). \quad (6)$$

In equation (6), the symbol $\sigma_f^2(x,y)$ denotes the local variance of the clean image f(x,y). The two equations 4 and 5 imply the knowledge of the local mean $\mu(x,y)$ and the local SD $\sigma_g(x,y)$. Unfortunately, the latter values are generally unknown. They should be estimated by some suitable manner.

In the Lee's MMSE filter, these values are calculated in a local fixed dimension window around the central pixel (x,y) as follows $$\mu(x,y)=\Sigma\Sigma g(i,j;x,y)/N_T \quad (7)$$

and $$\sigma_g^2(x,y)=\Sigma\Sigma((g(i,j;x,y)-\mu(x,y))^2)/N_T \quad (8)$$

wherein the summation are done over all i and j in the given local window, g(i,j;x,y) being values of a group of noisy input image parallel signals, $N_T$ denoting the pixel total number in the window. In homogenous regions where pixels are similar, equation (7) yields generally good results. However, in near edge or edge regions, the estimation given by equation (7), which does not take care of the non-stationary signal, becomes erroneous. In a similar manner, equation (8) can overestimate the signal variance in edge or near edge regions, the weight K(x,y) in equation (5) becomes unity (1) and the system given by equation (4) does not reduce any more noise in such cases. Moreover, the square values in equation (8) imply many expensive multipliers in an hardware implementation.

Meanwhile, in the Lee's Sigma filter, the weight K(x,y) is set to be fixed and equal to zero (0), which imply that the Sigma filter is always sub-optimum, and the mean value estimation is calculated only with selected similar intensity pixels in the window, that is:

$$\mu(x,y)=\Sigma\Sigma w(i,j;x,y)\cdot g(i,j;x,y))/N \quad (9)$$

$$N=\Sigma\Sigma w(i,j;x,y) \quad (10)$$

wherein the summation are done again over all i and j in the given local window, N bein a value of said selected-pixels count signal. However, in order to consider both homogenous and non-homogeneous regions, the pixel intensities g(i,j;x,y) are weighted by window binary signals w(i,j;x, y) defined as follows:

$$w(i,j;x,y)=\begin{cases} 1, & \text{if } |g(i,j,x,y)-g(x,y)|<T \\ 0, & \text{elsewhere} \end{cases} \quad (11)$$

wherein g(x,y)=g(0,0;x,y) is the intensity of the window central and considered pixel, T being a predetermined threshold value. The suggested threshold value in Sigma filters is equal to $2\sigma_n$. The higher the threshold value T, the more noise is reduced, but at the expense of blurring true small image edges. If the threshold value T is small, equation (11) will leave unchanged isolated strong spot noise.

In order to combine the main advantages of Lee's MMSE and Sigma filters, the noisy input signal g(x,y) shown at 301 in FIG. 3, is firstly fed to a preliminary low pass (LP) filter 302. The low pass filter 302 plays a very important role by partly reducing strong spot noise. Its output g*(x,y) allows robust segmentation in the presence of noise. For additive noise, it can be a simple filter with impulse response function lp(x,y) described by the following matrices:

$$lp(x, y) = \begin{bmatrix} 1/9 & 1/9 & 1/9 \\ 1/9 & 1/9 & 1/9 \\ 1/9 & 1/9 & 1/9 \end{bmatrix} \text{ or } \quad (12a)$$

$$lp(x, y) = \begin{bmatrix} 1/16 & 2/16 & 1/16 \\ 2/16 & 4/16 & 2/16 \\ 1/16 & 2/16 & 1/16 \end{bmatrix} \quad (12b)$$

The filter output g*(x,y) 303 is sent to a first pixel-based serial-to-parallel converter (PB-SPC) 306 receiving the noisy low-spatial frequency image signal to generate a group of noisy low-spatial frequency image parallel signals associated with a locally considered pixel and according to predetermined pixels-window characteristics, which parallel signals generated at 303' are fed to a pixel-based local window segmentation processor 304 that selects pixels in a local window which are similar to the considered current pixel. An implementation example of a PB-SPC will be described later with reference to FIG. 5. The segmentation working with filtered image, yields at its output 320 a set of window binary signals w(i,j;x,y) defined now as:

$$w(i, j; x, y) = \begin{cases} 1, & \text{if } |g^*(i, j; x, y) - g^*(x, y)| < T \\ 0, & \text{elsewhere} \end{cases} \quad (13)$$

wherein:

g*(i,j;x,y) is the values of the noisy low-spatial frequency image parallel signals associated with pixels included within the window with i=−k, . . . ,+l; j=−m, . . . ,+n, the window having dimensions of (k+l)×(m+n), k,l,m,n being appropriate positive integers;

g*(x,y) is the locally considered pixel value; and

T is a predetermined threshold value.

Since the noise component in the filtered image g*(x,y) is reduced, the threshold value T fed at an input 305 can be also reduced. Practically, the threshold value T can be set to $\sigma_n$ or usually to a fixed value selected from 8 to 16 in an eight (8) bits video system, if noise is weak enough. The original noisy image signal g (x,y) at 301 is sent to a second PB-SPC 321 receiving the noisy input image signal to generate a group of noisy input image parallel signals g(i,j;x,y) associated with the locally considered pixel and according to the predetermined pixels-window characteristics. The parallel signals g(i,j;x,y) generated at the PBSPC output 322 connected to a line 323 and the window binary signals w(i,j;x,y) at 320' are sent together to the mean value μ estimator 307 having an output 308 described by the above equations (9a) and (9b). In these equations, the term N is simply a count of selected pixels in the local window which are similar to the considered pixel (x,y) within the tolerance of threshold value T. A selected-pixels counter 327 with signal input w(i,j;x,y) 320 can be done by appropriate adders to realize equation (9b) above. The counter output signal at 328 represented in a few bits is sent to the mean value μ estimator 307. The SAW-SNR further comprises a minimum-mean-square-error filter generally designated at 329 receiving the noisy input image parallel signals g(i,j;x,y) at 322, the segmented local window parallel signals w(i,j;x,y) at 330, the selected-pixels count signal N at 331 and the mean pixel value signal μ(x,y) at 332 to generate a noise-filtered output image signal f*(x,y) according to an input noise statistic signal at 314. More specifically, the filter 329 comprises a statistical calculator 312 receiving the above signals g(i,j;x,y), w(i,j;x,y) and N to either generate a standard deviation (SD) signal or a variance signal at 313. In order to reduce the inherent complexity of equation (8) above, the proposed calculator 312 is preferably a standard deviation calculator yielding a SD value $\sigma_g$(x,y) at 313 estimated by absolute deviation mean as follows:

$$\sigma_g(x,y) = C^*(\Sigma\Sigma(w(i,j;x,y)\cdot(|g(i,j;x,y)-\mu(x,y)|)))/N. \quad (14)$$

In the latter equation, N is again the number of selected similar pixels in the local window. Moreover, depending on the noise distribution, an appropriate value for constant C can be chosen equal to about 1.25 for additive Gaussian noise, or to about 1.15 for additive uniform noise. The filter 329 further comprises a weight calculator 319. The current SD $\sigma_g$(x,y) at 313 as given by equation (14) and the noise input SD $\sigma_n$ at 314 are preferably applied to the weight calculator 319 generating weight K(x,y) as already described by equation (5) above. Although less efficient, the statistical calculator 312 may also be a variance calculator implementing equation (8) to generate a variance value $\sigma_g^2$(x,y) in which case the noise input variance $\sigma_n^2$ is fed to the weight calculator 319 to generate weight K(x,y) using same equation (5). In the case of white noise of constant variance $\sigma_g^2$, instead of a weight calculator 319, a lookup table (LUT) is preferably used, which is built by pre-calculating necessary weights K(x,y). In the latter case, the value of constant C in equation (14) can be chosen fixed and the input noise variance $\sigma_n^2$ represented by a few bits can be entered by an end-user to obtain the desired noise reduction level.

After proper delaying, the noisy image signal at 322 is applied in turn to an adder 309 included in the filter 329 through an input line 324. The adder output signal at 325 representing the current difference (g(x,y)−μ(x,y)) is weighted by the current weight K(x,y) signal at 315 by a multiplier 310 included in the filter 329. The multiplier output 316 and the mean value μ(x,y) are applied together to an adder 311 included in the filter 329 to yield the filtered image signal f*(x,y) 316 of the desired Single local Adaptive Window Spatial Noise Reducer (SAW-SNR) 318.

It is worthwhile to note that, in addition to the usual noisy input g(x,y) at 301 and the filtered output f*(x,y) at 316, the SAW-SNR 318 has also an input 300 for a window characteristics data (WIC) signal. This signal is used to select some window size and its relative position to the considered current pixel at the coordinates (x,y). In another words, the selected window is usually, but not absolutely necessary centered to the current pixel. Some pixel offsets or different window sizes can be useful for a more sophisticated spatial noise reducer, which will be described later according to a second preferred embodiment of the present invention.

Referring now to FIG. 4, there is illustrated a few examples of window characteristics relatively to the current pixel position. The window 401 is a 5×5 square one centered to the current pixel 400, a centered square window being suitable for progressive image. The dotted window 402 is also a centered window of dimension 3×7, i.e., 3 lines and 7 columns, an horizontal rectangular window being suitable for interlaced signal. For the case of a single adaptive window spatial noise reducer, centered windows are recommended. Moreover, equations (7), (9) and (10) above show that, at least in a homogeneous region, the larger the window the better the result. FIG. 4 illustrates also two windows 403 and 404 that are not centered on the current pixel. The window 403 has one pixel being offset to the left, while the window 404 has one pixel being offset to the right. Horizontal offset windows are suitable for economic purpose in a Parallel Multiple local Adaptive Window Spatial Noise Reducer (Parallel M-AW-SNR), which will be described later in detail with reference to FIG. 8.

Before referring to FIG. 7, which illustrates a functional implementation block diagram of the first embodiment in detail, in order to simplify and facilitate the presentation, let's consider now FIG. 6 that represents an example of a pixel-based sequential-to-parallel converter (PB-SPC) of 3×5 dimension. In order to create a local window for filtering or for segmentation, it is necessary to use a PB-SPC that converts a scanned image signal to multiple parallel signals corresponding to all pixel intensity values in the given window. The scanned image input signal g(x,y) at 501 is simply applied to appropriate line and pixel delays in series. For a window of 3×5 dimension, it takes at least two line delays 502, 504 and three (3) series of four (4) pixel delays 510–516, 520–526 and 530–536, respectively. In this example, if the window is centered, the current pixel is located at an output 523. The other output signals 501, 503, 505, 511, ... ,513, 533, ... ,537, correspond to the current pixel neighbors in the window. Turning now to FIG. 6a, there is illustrated a graphic notation of a scalar product (SP) from two vectors $\vec{a} = (a_1, a_2, \ldots, a_n)$ at an input 611 and $\vec{b} = (b_1, b_2, \ldots, b_n)$ at an input 612, according to the following relation:

$$SP = (\vec{a} \cdot \vec{b}) = \sum_{i=1}^{n} a_i b_i \quad (15)$$

wherein the summing is done over i for i=1,2, ... ,n. In the notation, n is the component number of the vectors $\vec{a}$ and $\vec{b}$. The scalar product (SP) at 616 is done by a scalar multiplier 613. Some implementation details of the scalar multiplier are shown in FIG. 6b. It consists of n (illustrated with n=3) parallel multipliers 613-1, 613-2, ... , 613-n and an adder 615 of n multiplier results 614-1, 614-2, ... ,614-n. The inputs of the $i^{th}$ multiplier 613-i are the components $a_i$, 611-i and $b_i$, 611-i of the respective vectors $\vec{a}$ and $\vec{b}$.

Referring now to FIG. 7, an implementation for the first embodiment of the proposed SAW-SNR basically described above with reference to in FIG. 3 will be now explained in detail. The noisy input image g(x,y) at 701 is applied to an input PB-SPC 702 of dimension 3×3 as part of the low-pass filter represented at 302 in FIG. 3. The PB-SPC vector output at 717 is applied in turn to a SP 741 that also receives a vector of low pass filter coefficients at 740. Assuming that equation (12a) above describes the low pass filter, all component values of the coefficient vector at 740 are equal to unity (1). The proportional term ⅑ in equation (12a) can be further absorbed by the threshold value in equation (13) above. Meanwhile, the output 718 of the PB-SPC 702, corresponding to the current pixel, is an appropriate delayed version of the input noisy image signal g(x,y). The SP output 703, corresponding to the low pass output signal 303 in FIG. 3, is sent to a PB-SPC 704, corresponding to the PB-SPC 306 in FIG. 3, of desired window dimension in order to get the pixel intensity vector at 705 of the given local window. A single input 706 represents the current filtered pixel intensity output signal g*(x,y). Let $N_T$ being the window total pixel number and also the component number of the vector at 705 in which the signal component at 706 corresponds to the current considered pixel intensity. The vector at 705 and the current component at 706 are then applied to a vector adder 707 as illustrated by a double circle, which in fact includes $N_T$ parallel adders, to calculate the $N_T$ differences (g*(i,j;x,y)−g*(x,y)) as required by equation (13) above. The vector adder output 708 is applied to a vector full-wave rectifier 739 necessary now for calculating |g*(i,j;x,y)−g(x,y)| for all i and j in the window. For segmentation purpose, the rectifier output vector at 740 and the threshold vector at 709 are sent to a vector adder 710, from which a resulting vector at output 711 is fed to a comparison detector 712. The detector output vector $\vec{w}$ at 713 composed of $N_T$ binary components {w(i,j;x,y)} is sent now to three (3) SP 715, 724 and 728. The SP 715 is simply provided as part of the selected similar pixel counter, and is provided with a second input 714 fed by a constant and unitary (1) vector. The SP output 716 represents the local selected similar pixel number N, corresponding to the current pixel intensity. Meanwhile, the delayed version of the input noisy signal g (x,y) at 718 is sent to a PB-SPC 719, corresponding to the PB-SPC 321 in FIG. 3, of the same desired window dimension than that of PB-SPC 704. The parallel output vector at 720 and the segmented window vector $\vec{w}$ at 713 are applied together to the SP 724 that yields at its output 735 the summing value of similar pixel intensities in the local window. The total and local value signal at 735 and the local number N signal at 716 are applied to a ROM or LUT 737 to get a local mean μ at 721. It is pointed out that a few bits can represent the value N. The ROM or LUT 737 is proposed to avoid an expensive division. In order to determine the local SD $\sigma_g$ of the noisy input image, the vector of $N_T$ parallel windowed noisy pixels at 720 and the obtained local mean μ at 721' are applied also to a vector adder 722. The vector adder output 723 is sent in turn to a vector full-wave rectifier 725 generating at 726 an output difference vector {|g(i,j;x,y)−μ(x,y)|} of $N_T$ components. The difference vector signals and the segmented window vector $\vec{w}$ signals are sent to the SP 728 that yields at the output 729 the weighted sum (ΣΣw(i,j;x,y)·(|g(i,j;x,y)−μ(x,y)|)) as necessary for equation (14) above. The multiplication by a constant C equal to about 1.25 for Gaussian noise and the division by N selected similar pixel number at 716 can be integrated in a ROM or LUT 731 generating at an output 743 an estimated local SD $\sigma_g$ of the noisy input image, which is fed with the SD $\sigma_n$ of the input noise at 730 to a weight calculator 742 implementing equation (5) above. The current calculated weight output K(x,y) at 732 is used to weigh the current difference (g(x,y)−μ(x,y)) at 727 via a multiplier 733. The multiplier weighted output signal at 736 is sent to an adder 734. The above weighted current difference signal at 736 and the local mean μ(x,y) at 721, via an adder 734, give the noise-filtered output image signal f*(x,y) at 738.

Referring now to FIG. 8, a second embodiment of the present invention in the form of a Parallel Multiple local Adaptive Window Spatial Noise Reducer (M-AW-SNR) will be now described. Let g(x,y) be the noisy image input signal at 801, which corresponds to the same input signal at 301 in FIG. 3. The noisy signal is applied simultaneously to L parallel SAW-SNRs, respectively designated at 318-1, 318-2, ... and 318-L. Each SAW-SNR 318, which was basically described above with reference to FIG. 3, is working now with a distinct set of window characteristics WIC fed at inputs 300-1 to 300-L. The SAW-SNR outputs, 316-1 to 316-L, are added together via an adder 820 as part of an averaging unit 824. The adder output 821 is divided by L and then rounded by a calculator 822 included in the averaging unit 824. The result output 823 is also the desired final signal of the Parallel M-AW-SNR. It is to be understood that the L low pass filters included in the L parallel SAW-SNRs can be replaced by a single low pass filter 802 indicated in dotted lines in FIG. 8. The proposed Parallel M-AW-SNR configuration can be justified by its performance. Let $h_i(x,y)$ be the $i^{th}$ SAW-SNR output, 318-i, defined as follows:

$$h_i(x,y)=f(x,y)+r_i(x,y) \qquad (16)$$

The residual noisy component $r_i(x,y)$ is supposed to be non-correlated to the clean image $f(x,y)$. This supposition is valid at least in edge regions where noise can remain after applying a SAW-SNR. The correlation between two components $r_i(x,y)$ and $r_j(x,y)$ resulted from two different but overlapped windows with similar size, is supposed equal to followings:

$$E(r_i(x,y)\cdot r_j(x,y))=\sigma_r^2\cdot\rho_{ij} \qquad (17)$$

The term $\sigma_r^2$ denotes the variance of the residual SAW-SNR noise, and $\rho_{ij}$ is the normalized cross-correlation between noisy components $r_i(x,y)$ and $r_j(x,y)$. Let JPM and J denoting respectively the performance indices of a Parallel M-AW-SNR and a SAW-SNR. It can be shown that the improvement J/JPM is equal to:

$$J/JPM=L^2/\Sigma\Sigma\rho_{ij}>1 \qquad (18)$$

The improvement has been verified experimentally even in the case of a SAW-SNR, which utilizes, as window, the union of all individual ones in a given Parallel M-AW-SNR. The proposed Parallel M-AW-SNR is an averaging configuration that can also be justified by its simplicity. In fact, it would be much more complicated to obtain an optimum linear combination with L SAW-SNRs output images. The Parallel M-AW-SNR configuration is composed of L parallel SAW-SNRs as previously described. It could be also possible to utilize SAW-SNRs in series (not shown). If the residual noise after each SAW-SNR is supposed to be still non-correlated to the clean image $f(x,y)$, it can be theoretically shown that the performance indicia JSM associated with a Serial M-AW-SNR is given by the following equation:

$$JMS=\sigma_f^2(x,y)\cdot\sigma_n^2(x,y)/(\sigma_f^2(x,y)+L\cdot\sigma_n^2) \qquad (19)$$

In equation (19), the terms $\sigma_f^2(x,y)$ and $\sigma_n^2$ denote respectively the local clean image variance and the original input noise variance. Hence, for the Serial M-AW-SNR, a theoretical improvement of:

$$J/JSM=(\sigma_f^2(x,y)+L\sigma_n^2)/(\sigma_f^2(x,y)+\sigma_n^2)>1 \qquad (20)$$

over the single SAW-SNR is possible. However, this expression shows that, in edge regions, the improvement is not necessary appreciable. Moreover, serial configuration requires estimation of each individual residual noise, which imply a costly hardware implementation. Therefore, the Parallel M-AW-SNR is recommended over the Serial M-AW-SNR.

Turning now to FIG. 9, a third preferred embodiment of the present invention in the form of a Single local Adaptive Window Spatial Noise Reducer with controllable noise statistic estimator will be now described. The noisy image signal $g(x,y)$ is applied at 301, as usual, to the basic SAW-SNR 318 generating the noise-filtered output image signal $f^*(x,y)$ at 316. At the same time, the noisy image is sent also to a High-Pass Two-Dimensional Filter HP2DF 901, which extracts only very high vertical and horizontal frequency components in the input image. The filter bandpass bandwidth is chosen such that the filter output 902 contains mainly noise components, but not clean image. Justification for the choice of a HP2DF can be explained generally by the wide-band nature of noise. The utilize HP2DF is preferably a diamond filter, an example of impulse response function thereof being as follows:

$$hp2d(x,y)=\begin{bmatrix} 0 & 0 & 0 & -1 & 0 & 0 & 0 \\ 0 & 0 & -3 & 8 & -3 & 0 & 0 \\ 0 & -3 & 16 & -25 & 16 & -3 & 0 \\ -1 & 8 & -25 & 32 & -25 & 8 & -1 \\ 0 & -3 & 16 & -25 & 16 & -3 & 0 \\ 0 & 0 & -3 & 8 & -3 & 0 & 0 \\ 0 & 0 & 0 & -1 & 0 & 0 & 0 \end{bmatrix}/256 \qquad (21)$$

The noisy horizontal/vertical high-spatial frequency image signal at 902 is fed to a PBSPC 911 to generate at output 913 a group of noisy horizontal/vertical high-spatial frequency image parallel signals associated with the locally considered pixel and according to the set of predetermined pixels-window characteristics. The BPSPC output 913 with the segmented local window parallel signals $w(i,j;x,y)$ at 320 and the selected-pixels count signal Nat 328 available from the SAW-SNR 318 are sent to a statistic calculator 912 to generate a resulting noise statistic signal associated with the locally considered pixel. As explained before regarding the first preferred embodiment, while the statistic calculator 912 is preferably a SD calculator generating a SD resulting signal $\sigma_R(x,y)$ at 904, it could be a variance calculator directly generating a variance resulting signal $\sigma_R^2(x,y)$ at 904. The calculator 912 is similar to the calculator 312 described before with reference to FIG. 3, but provided with a built-in mean value $\mu$ estimator. The calculator resulting signal at 904 is applied at the input of a look-up table LUT 905 that estimates, in turn, at its output 907, a mean value of local noise input SD $\sigma_m(x,y)$ (or variance $\sigma_m^2(x,y)$). The LUT input-output relationship between the two local standard deviations $\sigma_r(x,y)$ (or variance $\sigma_r^2(x,y)$) and $\sigma_m(x,y)$ (or variance $\sigma_m^2(x,y)$) can be described by the following method. Let consider the linear portion in Eq.5 expressed by:

$$K(x,y)=(\sigma_g^2(x,y)-\sigma_n^2(x,y))/(\sigma_g^2(x,y)) \qquad (5b)$$

wherein the unknown additive noise variance $\sigma_n^2(x,y)$ is supposed now to be varying. It is thus necessary to pre-estimate this variance value for each pixel located at $(x,y)$.

In many situations where the processing is well defined, such as for NTSC or PAL encoding/decoding and DCT based compression/decompression, an available original and clean test signal $f(x,y)$ can be used for noise pre-learning. FIG. 9 illustrates partly a proposed configuration at 960 used for performing an off-line noise variance pre-estimation. The original test signal $f(x,y)$ at 950 is applied to the above-mentioned processing at 951 which gives a test noisy image signal $g(x,y)$ at 952. The additive test noise signal $n(x,y)$ at 954 is then obtained by the difference $(g(x,y)-f(x,y))$ provided by an adder 953 and is sent in turn to a statistic calculator 955 similar to the calculator 912. The test noise SD $\sigma_m(x,y)$ (or the test noise variance $\sigma_m^2(x,y)$) estimation is done in the same context of that of the signal $g(x,y)$ in the proposed SAW-SNR 318, with the segmented window parallel signals $w(i,j;x,y)$ at 320 and the selected-pixels count signal N at 328. In words, for a considered pixel at $(x,y)$, one obtains a pair of SD values $(\sigma_r(x,y),\sigma_n(x,y))$ (or a pair of variance values $(\sigma_r^2(x,y),\sigma_n^2(x,y))$). For the whole test picture or set of test pictures, a given value of $\sigma_r(or\sigma_r^2)$ can have many resulted values of $\sigma_m$ (or $\sigma_m^2$). In order to obtain a unique input-output relationship for the LUT 905, it is necessary, for a given $\sigma_r$ (or $\sigma_r^2$), to define a single value $\sigma_m$ representing all possible values of $\sigma_m$. For the preferred SD calculation, proposed estimations for $\sigma_m$ are as follows:

$$\sigma_m = \text{mean}(\sigma_m, \text{ given a value of } \sigma_r); \quad (22)$$

or $$\sigma_m = \text{mode}(\sigma_m, \text{ given a value of } \sigma_r) \quad (23)$$

The estimation (22) or (23) can be done then on an off-line basis by a data storage and estimation device 957. The input-output result $(\sigma_r, \sigma_m)$ at 904 and 958 respectively, permits the establishment of a pre-calculated LUT 905 for real time processing involving an unknown image. If the memory LUT 905 is large enough, some controllable bits can be fed at input 903 representing a learning or functional condition, for example for NTSC, PAL or 12 Mbit MPEG. The main requirement of the method is the prior knowledge of the processing to create the noisy image g(x,y) from the clean image f(x,y). The LUT output signal $\sigma_m(x,y)$ at 907 could be sent directly (not shown) to the input 314 of the SAW-SNR 318 as local SD of the input noise. However, the estimated value $\sigma_m(x,y)$ in equations 22 or 23 is only a representative one and is not necessary always good for all spatial varying image conditions. In such cases, the controllable noise statistic estimator preferably comprises a conditional weighting unit 909 which could be another LUT that receives the signal $\sigma_m(x,y)$ at 907 and which is controlled, in turn, by the output 910 of a condition detector 908. The condition detector is driven by the input noisy image signal g(x,y) through line 301'. Depending on the application nature, The condition detector 908 classifies the current pixel as belonging to some specific regions such as edge regions, flat regions, near edge near flat regions, texture regions etc., and accordingly applies an appropriate weight or function at 910 to the mean value $\sigma_m(x,y)$ fed at 907 for each region. As an example, for the case of ringing noise, the conditional weighting output can be $(½) \cdot \sigma_m(x,y)$ in contour or texture regions, $2 \cdot \sigma_m(x,y)$ in near edge near flat regions, $(¼) \cdot \sigma_m(x,y)$ in flat regions (to protect small details that does not necessarily create the ringing noise) and $\sigma_m(x,y)$ elsewhere. The conditional weighting output is then sent to the SAW-SNR input 314 as local SD (or variance) of the input noise. It is to be understood that, for specific noise such as the coding block effect, the proposed method may be used provided appropriate specific conditional techniques and data are applied.

We claim:

1. An adaptive apparatus for spatially reducing noise in a noisy input image signal comprising:

a low-pass filter receiving said noisy input image signal to generate a noisy low-spatial frequency image signal;

a first pixel-based serial-to-parallel converter receiving the noisy low-spatial frequency image signal to generate a group of noisy low-spatial frequency image parallel signals associated with a locally considered pixel and according to predetermined pixels-window characteristics;

a pixel-based local window segmentation processor comparing values of the noisy low-spatial frequency image parallel signals associated with pixels included within the window with the locally considered pixel value to generate segmented local window parallel signals associated with selected pixels;

a counter generating a selected-pixels count signal;

a second pixel-based serial-to-parallel converter receiving the noisy input image signal to generate a group of noisy input image parallel signals associated with the locally considered pixel and according to the predetermined pixels-window characteristics;

a mean estimator combining the noisy input image parallel signals with the segmented local window parallel signals and the selected-pixels count signal to generate a mean pixel value signal associated with the locally considered pixel;

a minimum-mean-square-error filter receiving the noisy input image parallel signals, the segmented local window parallel signals, the selected-pixels count signal and the mean pixel value signal to generate a noise-filtered output image signal according to an input noise statistic signal.

2. An apparatus according to claim 1, wherein values of said segmented local window parallel signals are given by:

$$w(i, j; x, y) = \begin{cases} 1, & \text{if } |g^*(i, j; x, y) - g^*(x, y)| < T \\ 0, & \text{elsewhere} \end{cases}$$

wherein:

$g^*(i,j;x,y)$ is said values of the noisy low-spatial frequency image parallel signals associated with pixels included within the window with i=−k, . . . ,+l; j=−m, . . . ,+n, said window having dimensions of (k+l)×(m+n), k,l,m,n being appropriate positive integers;

$g^*(x,y)$ is said locally considered pixel value; and

T is a predetermined threshold value.

3. An apparatus according to claim 2, wherein a value of said mean pixel value signal is given by:

$$\mu(x,y) = (\Sigma\Sigma w(i,j;x,y) \cdot g(i,j;x,y))/N$$

with $$N = \Sigma\Sigma w(i,j;x,y)$$

wherein:

g(i,j;x,y) are values of said group of noisy input image parallel signals; and

N is a value of said selected-pixels count signal.

4. An apparatus according to claim 1, wherein said input noise statistic signal is an input noise variance signal, said minimum-mean-square-error filter including:

a variance calculator for generating an estimated variance signal from said noisy input image parallel signals, said segmented local window parallel signals, said selected-pixels count signal and said mean pixel value signal;

a weight calculator for generating a weight signal from the estimated variance signal and the input noise variance signal;

a first adder having an inverting input receiving said mean pixel value signal and a positive input receiving the noisy input signal associated with the locally considered pixel to generate a difference signal;

a multiplier receiving the weight signal and the difference signal to generate a weighted difference signal;

a second adder having a first positive input receiving the mean pixel value signal and a second positive input receiving the weighted difference signal to generate said noise-filtered output image signal.

5. An apparatus according to claim 1, wherein said input noise statistic signal is an input noise standard deviation signal, said minimum-mean-square-error filter including:

a standard deviation calculator for generating an estimated standard deviation signal from said noisy input image parallel signals, said segmented local window parallel signals, said selected-pixels count signal and said mean pixel value signal;

a weight calculator for generating a weight signal from the estimated standard deviation signal and the input noise standard deviation signal;

a first adder having an inverting input receiving said mean pixel value signal and a positive input receiving the noisy input signal associated with the locally considered pixel to generate a difference signal;

a multiplier receiving the weight signal and the difference signal to generate a weighted difference signal;

a second adder having a first positive input receiving the mean pixel value signal and a second positive input receiving the weighted difference signal to generate said noise-filtered output image signal.

6. An apparatus according to claim 5, wherein values of said segmented local window parallel signals are given by:

$$w(i,j;x,y) = \begin{cases} 1, & \text{if } |g^*(i,j;x,y) - g^*(x,y)| < T \\ 0, & \text{elsewhere} \end{cases}$$

wherein:

$g^*(i,j;x,y)$ is said values of the noisy low-spatial frequency image parallel signals associated with pixels included within the window with $i=-k, \ldots, +l$; $j=-m, \ldots, +n$, said window having dimensions of $(k+l)\times(m+n)$, $k,l,m,n$ being appropriate positive integers;

$g^*(x,y)$ is said locally considered pixel value;

T is a predetermined threshold value;

wherein said mean pixel value signal is defined by:

$$\mu(x,y) = (\Sigma\Sigma w(i,j;x,y) \cdot g(i,j;x,y))/N$$

with $$N = \Sigma\Sigma w(i,j;x,y)$$

wherein:

$g(i,j;x,y)$ are values of said group of noisy input image parallel signals; and N is a value of said selected-pixels count signal; and wherein a value of said estimated standard deviation signal is given by:

$$\sigma_g(x,y)C \cdot (\Sigma\Sigma(w(i,j;x,y) \cdot (|g(i,j;x,y) - \mu(x,y)|)))/N.$$

7. An adaptive apparatus for spatially reducing noise in a noisy input image signal comprising:

a plurality of parallel-connected adaptive spatial noise reducers each presenting a distinct set of predetermined pixels-window characteristics, each said noise reducer receiving said noisy input image signal to generate a corresponding pre-filtered output image signal and an averaging unit receiving each said pre-filtered output image signal at a corresponding positive input thereof to generate a noise-filtered output image signal, wherein each said noise reducer comprises:

a low-pass filter receiving said noisy input image signal to generate a noisy low-spatial frequency image signal;

a first pixel-based serial-to-parallel converter receiving the noisy low-spatial frequency image signal to generate a group of noisy low-spatial frequency image parallel signals associated with a locally considered pixel and according to the set of predetermined pixels-window characteristics;

a pixel-based local window segmentation processor comparing values of the noisy low-spatial frequency image parallel signals associated with pixels included within the window with the locally considered pixel value to generate segmented local window parallel signals associated with selected pixels;

a counter generating a selected-pixels count signal;

a second pixel-based serial-to-parallel converter receiving the noisy input image signal to generate a group of noisy input image parallel signals associated with the locally considered pixel and according to the set of predetermined pixels-window characteristics;

a mean estimator combining the noisy input image parallel signals with the segmented local window parallel signals and the selected-pixels count signal to generate a mean pixel value signal associated with the locally considered pixel;

a minimum-mean-square-error filter receiving the noisy input image parallel signals, the segmented local window parallel signals, the selected-pixels count signal and the mean pixel value signal to generate said pre-filtered output image signal according to an input noise statistic signal.

8. An adaptive apparatus for spatially reducing noise in a noisy input image signal comprising:

a low-pass filter receiving said noisy input image signal to generate a noisy low-spatial frequency image signal;

a plurality of parallel-connected adaptive spatial noise reducers each presenting a distinct set of predetermined pixels-window characteristics, each said noise reducer receiving said noisy low-spatial frequency image signal to generate a corresponding pre-filtered output image signal and an averaging unit receiving each said pre-filtered output image signal at a corresponding positive input thereof to generate a noise-filtered output image signal, wherein each said noise reducer comprises:

a first pixel-based serial-to-parallel converter receiving the noisy low-spatial frequency image signal to generate a group of noisy low-spatial frequency image parallel signals associated with a locally considered pixel and according to said set of predetermined pixels-window characteristics;

a pixel-based local window segmentation processor comparing values of the noisy low-spatial frequency image parallel signals associated with pixels included within the window with the locally considered pixel value to generate segmented local window parallel signals associated with selected pixels;

a counter generating a selected-pixels count signal;

a second pixel-based serial-to-parallel converter receiving the noisy input image signal to generate a group of noisy input image parallel signals associated with the locally considered pixel and according to the set of predetermined pixels-window characteristics;

a mean estimator combining the noisy input image parallel signals with the segmented local window parallel signals and the selected-pixels count signal to generate a mean pixel value signal associated with the locally considered pixel;

a minimum-mean-square-error filter receiving the noisy input image parallel signals, the segmented local window parallel signals, the selected-pixels count signal and the mean pixel value signal to generate said pre-filtered output image signal according to an input noise statistic signal.

9. An apparatus according to claim 7 or 8, wherein values of said segmented local window parallel signals are given by:

$$w(i, j; x, y) = \begin{cases} 1, & \text{if } |g^*(i, j; x, y) - g^*(x, y)| < T \\ 0, & \text{elsewhere} \end{cases}$$

wherein:
  $g^*(i,j;x,y)$ is said values of the noisy low-spatial frequency image parallel signals associated with pixels included within the window with i=−k, . . . ,+l; j=−m, . . . ,+n, said window having dimensions of (k+l)×(m+n), k,l,m,n being appropriate positive integers characterizing said distinct set of predetermined pixels-window characteristics;
  $g^*(x,y)$ is said locally considered pixel value;
  T is a predetermined threshold value; and
wherein a value of said mean pixel value signal is given by:

$$\mu(x,y)=(\Sigma\Sigma w(i,j;x,y)\cdot g(i,j;x,y))/N$$

with $$N=\Sigma\Sigma w(i,j;x,y)$$

wherein:
  g(i,j;x,y) are values of said group of noisy input image parallel signals; and
  N is a value of said selected-pixels count signal.

10. An adaptive apparatus for spatially reducing noise in a noisy input image signal comprising:
  an adaptive spatial noise reducer including:
    a low-pass filter receiving said noisy input image signal to generate a noisy low-spatial frequency image signal;
    a first pixel-based serial-to-parallel converter receiving the noisy low-spatial frequency image signal to generate a group of noisy low-spatial frequency image parallel signals associated with a locally considered pixel and according to a set of predetermined pixels-window characteristics;
    a pixel-based local window segmentation processor comparing values of the noisy low-spatial frequency image parallel signals associated with pixels included within the window with the locally considered pixel value to generate segmented local window parallel signals associated with selected pixels;
    a counter generating a selected-pixels count signal;
    a second pixel-based serial-to-parallel converter receiving the noisy input image signal to generate a group of noisy input image parallel signals associated with the locally considered pixel and according to the set of predetermined pixels-window characteristics;
    a mean estimator combining the noisy input image parallel signals with the segmented local window parallel signals and the selected-pixels count signal to generate a mean pixel value signal associated with the locally considered pixel;
    a minimum-mean-square-error filter receiving the noisy input image parallel signals, the segmented local window parallel signals, the selected-pixels count signal and the mean pixel value signal to generate a noise-filtered output image signal according to an input noise statistic signal; and
  a controllable noise statistic estimator including:
    a high-pass two-dimensional filter receiving the noisy input image signal to generate a noisy horizontal/vertical high-spatial frequency image signal;
    a third pixel-based serial-to-parallel converter receiving the noisy horizontal/vertical high-spatial frequency image signal to generate a group of noisy horizontal/vertical high-spatial frequency image parallel signals associated with the locally considered pixel and according to the set of predetermined pixels-window characteristics;
    a statistic calculator combining the noisy horizontal/vertical high-spatial frequency image parallel signals with the segmented local window parallel signals and the selected-pixels count signal to generate a resulting noise statistic signal associated with the locally considered pixel;
    a noise statistic estimator unit generating said input noise statistic signal from the resulting noise statistic signal.

11. An apparatus according to claim 10, wherein values of said segmented local window parallel signals are given by:

$$w(i, j; x, y) = \begin{cases} 1, & \text{if } |g^*(i, j; x, y) - g^*(x, y)| < T \\ 0, & \text{elsewhere} \end{cases}$$

wherein:
  $g^*(i,j;x,y)$ is said values of the noisy low-spatial frequency image parallel signals associated with pixels included within the window with i=−k, . . . ,+l; j=−m, . . . ,+n, said window having dimensions of (k+l)×(m+n), k,l,m,n being appropriate positive integers;
  $g^*(x,y)$ is said locally considered pixel value; and
  T is a predetermined threshold value.

12. An apparatus according to claim 11, wherein a value of said mean pixel value signal is given by:

$$\mu(x,y)=(\Sigma\Sigma w(i,j;x,y)\cdot g(i,j;x,y))/N$$

with $$N=\Sigma\Sigma w(i,j;x,y)$$

wherein:
  g(i,j;x,y) are values of said group of noisy input image parallel signals; and
  N is a value of said selected-pixels count signal.

13. An apparatus according to claim 10, wherein said input noise statistic signal is an input noise variance signal, said controllable noise statistic estimator is a controllable noise variance estimator, said statistic calculator is a variance calculator, said resulting noise statistic signal is a resulting noise variance signal, said noise statistic estimator unit is a noise variance estimator unit.

14. An apparatus according to claim 13, wherein said noise variance estimator includes:
  a noise mean variance estimator receiving said input resulting noise variance signal to generate a mean variance signal;
  a condition detector receiving said noisy input image signal to detect a spatial characteristic of said locally considered pixel;
  a weighting device operatively connected to the condition detector for combining the mean variance signal with a weight value corresponding to a detected spatial characteristic to generate said input noise variance signal.

15. An apparatus according to claim 10, wherein said input noise statistic signal is an input noise standard deviation signal, said controllable noise statistic estimator is a controllable noise standard deviation estimator, said statistic calculator is a standard deviation calculator, said resulting noise statistic signal is a resulting noise standard deviation signal, said noise statistic estimator unit is a noise standard deviation estimator unit.

16. An apparatus according to claim 15, wherein values of said segmented local window parallel signals are given by:

$$w(i, j; x, y) = \begin{cases} 1, & \text{if } |g^*(i, j; x, y) - g^*(x, y)| < T \\ 0, & \text{elsewhere} \end{cases}$$

wherein:
  $g^*(i,j;x,y)$ is said values of the noisy low-spatial frequency image parallel signals associated with pixels included within the window with i=−k, . . . ,+l; j=−m, . . . ,+n, said window having dimensions of (k+l)×(m+n), k,l,m,n being appropriate positive integers;
  $g^*(x,y)$ is said locally considered pixel value;
  T is a predetermined threshold value;
wherein said mean pixel value signal is defined by:

$$\mu(x,y) = (\Sigma\Sigma w(i,j;x,y) \cdot g(i,j;x,y))/N$$

with $$N = \Sigma\Sigma w(i,j;x,y)$$

wherein:
  $g(i,j;x,y)$ are values of said group of noisy input image parallel signals;
  N is a value of said selected-pixels count signal; and
  wherein a value of said estimated standard deviation signal is given by:

$$\sigma_g(x,y) = C \cdot (\Sigma\Sigma(w(i,j;x,y) \cdot (|g(i,j;x,y) - \mu(x,y)|)))/N.$$

17. An apparatus according to claim 15, wherein said noise standard deviation estimator includes:
  a noise mean standard deviation estimator receiving said input resulting noise standard deviation signal to generate a mean standard deviation signal;
  a condition detector receiving said noisy input image signal to detect a spatial characteristic of said locally considered pixel;
  a weighting device operatively connected to the condition detector for combining the mean standard deviation signal with a weight value corresponding to a detected spatial characteristic to generate said input noise standard deviation signal.

18. An adaptive method for spatially reducing noise in a noisy input image signal comprising the steps of:
  i) filtering said noisy input image signal to generate a noisy low-spatial frequency image signal;
  ii) converting the noisy low-spatial frequency image signal to a group of noisy low-spatial frequency image parallel signals associated with a locally considered pixel and according to a set of predetermined pixels-window characteristics;
  iii) comparing values of the noisy low-spatial frequency image parallel signals associated with pixels included within the window with the locally considered pixel value to generate segmented local window parallel signals associated with selected pixels;
  iv) generating a selected-pixels count signal;
  v) converting the noisy input image signal to a group of noisy input image parallel signals associated with the locally considered pixel and according to the set of predetermined pixels-window characteristics;
  vi) combining the noisy input image parallel signals with the segmented local window parallel signals and the selected-pixels count signal to generate a mean pixel value signal associated with the locally considered pixel; and
  vii) processing the noisy input image parallel signals with a minimum-mean-square-error filter using the segmented local window parallel signals, the selected-pixels count signal and the mean pixel value signal to generate a noise-filtered output image signal according to an input noise statistic signal.

19. A method according to claim 18, wherein values of said segmented local window parallel signals are given by:

$$w(i, j; x, y) = \begin{cases} 1, & \text{if } |g^*(i, j; x, y) - g^*(x, y)| < T \\ 0, & \text{elsewhere} \end{cases}$$

wherein:
  $g^*(i,j;x,y)$ is said values of the noisy low-spatial frequency image parallel signals associated with pixels included within the window with i=−k, . . . ,+l; j=−m, . . . ,+n, said window having dimensions of (k+l)x(m+n), k,l,m,n being appropriate positive integers;
  $g^*(x,y)$ is said locally considered pixel value; and
  T is a predetermined threshold value.

20. A method according to claim 19, wherein a value of said mean pixel value signal is given by:

$$\mu(x,y) = (\Sigma\Sigma w(i,j;x,y) \cdot g(i,j;x,y))/N$$

with $$N = \Sigma\Sigma w(i,j;x,y)$$

wherein:
  $g(i,j;x,y)$ are values of said group of noisy input image parallel signals;
  N is a value of said selected-pixels count signal.

21. A method according to claim 18, wherein said input noise statistic signal is an input noise variance signal, said minimum-mean-square-error algorithm including the steps of:
  a) generating an estimated variance signal from said noisy input image parallel signals, said segmented local window parallel signals, said selected-pixels count signal and said mean pixel value signal;
  b) generating a weight signal from the estimated variance signal and the input noise variance signal;
  c) subtracting said mean pixel value signal from the noisy input signal associated with the locally considered pixel to generate a difference signal;
  d) multiplying the weight signal with the difference signal to generate a weighted difference signal;
  e) adding the mean pixel value signal and the weighted difference signal to generate said noise-filtered output image signal.

22. A method according to claim 18, wherein said input noise statistic signal is an input noise standard deviation signal, said minimum-mean-square-error algorithm including the steps of:
  a) generating an estimated standard deviation signal from said noisy input image parallel signals, said segmented local window parallel signals, said selected-pixels count signal and said mean pixel value signal;

b) generating a weight signal from the estimated standard deviation signal and the input noise variance signal;
c) subtracting said mean pixel value signal from the noisy input signal associated with the locally considered pixel to generate a difference signal;
d) multiplying the weight signal with the difference signal to generate a weighted difference signal;
e) adding the mean pixel value signal and the weighted difference signal to generate said noise-filtered output image signal.

23. A method according to claim 18, wherein values of said segmented local window parallel signals are given by:

$$w(i,j;x,y) = \begin{cases} 1, & \text{if } |g^*(i,j,x,y) - g^*(x,y)| < T \\ 0, & \text{elsewhere} \end{cases}$$

wherein:

$g^*(i,j;x,y)$ is said values of the noisy low-spatial frequency image parallel signals associated with pixels included within the window with $i=-k,\ldots,+l$; $j=-m,\ldots,+n$, said window having dimensions of $(k+l)\times(m+n)$, k,l,m,n being appropriate positive integers;

$g^*(x,y)$ is said locally considered pixel value;

T is a predetermined threshold value;

wherein said mean pixel value signal is defined by:

$$\mu(x,y) = (\Sigma\Sigma w(i,j;x,y)\cdot g(i,j;x,y))/N$$

with $$N = \Sigma\Sigma w(i,j;x,y)$$

wherein:

$g(i,j;x,y)$ are values of said group of noisy input image parallel signals;

N is a value of said selected-pixels count signal; and wherein a value of said estimated standard deviation signal is given by:

$$\sigma_g(x,y) = C\cdot(\Sigma\Sigma(w(i,j;x,y)\cdot(|g(i,j;x,y)-\mu(x,y)|)))/N.$$

24. An adaptive method for spatially reducing noise in a noisy input image signal comprising the steps of:

i) filtering said noisy input image signal to generate a noisy low-spatial frequency image signal;
ii) converting the noisy low-spatial frequency image signal to a group of noisy low-spatial frequency image parallel signals associated with a locally considered pixel and according to a set of predetermined pixels-window characteristics;
iii) comparing values of the noisy low-spatial frequency image parallel signals associated with pixels included within the window with the locally considered pixel value to generate segmented local window parallel signals associated with selected pixels;
iv) generating a selected-pixels count signal;
v) converting the noisy input image signal to a group of noisy input image parallel signals associated with the locally considered pixel and according to the set of predetermined pixels-window characteristics;
vi) combining the noisy input image parallel signals with the segmented local window parallel signals and the selected-pixels count signal to generate a mean pixel value signal associated with the locally considered pixel;
vii) processing the noisy input image parallel signals with a minimum-mean-square-error filter using the segmented local window parallel signals, the selected-pixels count signal and the mean pixel value signal to generate a pre-filtered output image signal according to an input noise statistic signal;
viii) repeating said steps ii) to vii) according to at least one further complementary set of pixels-window characteristics to generate a further pre-filtered output image signal according to the input noise statistic signal; and
ix) averaging said output image signals to generate a noise-filtered output image signal.

25. A method according to claim 24, wherein values of said segmented local window parallel signals are given by:

$$w(i,j;x,y) = \begin{cases} 1, & \text{if } |g^*(i,j,x,y) - g^*(x,y)| < T \\ 0, & \text{elsewhere} \end{cases}$$

wherein:

$g^*(i,j;x,y)$ is said values of the noisy low-spatial frequency image parallel signals associated with pixels included within the window with $i=-k,\ldots,+l$; $j=-m,\ldots,+n$, said window having dimensions of $(k+l)\times(m+n)$, k,l,m,n being appropriate positive integers characterizing said distinct set of predetermined pixels-window characteristics;

$g^*(x,y)$ is said locally considered pixel value;

T is a predetermined threshold value; and wherein a value of said mean pixel value signal is given by:

$$\mu(x,y) = (\Sigma\Sigma w(i,j;x,y)\cdot g(i,j;x,y))/N$$

with $$N = \Sigma\Sigma w(i,j;x,y)$$

wherein:

$g(i,j;x,y)$ are values of said group of noisy input image parallel signals; and N is a value of said selected-pixels count signal.

26. An adaptive method for spatially reducing noise in a noisy input image signal comprising:

i) filtering said noisy input image signal to generate a noisy low-spatial frequency image signal;
ii) converting the noisy low-spatial frequency image signal to a group of noisy low-spatial frequency image parallel signals associated with a locally considered pixel and according to a set of predetermined pixels-window characteristics;
iii) comparing values of the noisy low-spatial frequency image parallel signals associated with pixels included within the window with the locally considered pixel value to generate segmented local window parallel signals associated with selected pixels;
iv) generating a selected-pixels count signal;
v) converting the noisy input image signal to a group of noisy input image parallel signals associated with the locally considered pixel and according to the set of predetermined pixels-window characteristics; vi) combining the noisy input image parallel signals with the segmented local window parallel signals and the selected-pixels count signal to generate a mean pixel value signal associated with the locally considered pixel;
vii) filtering the noisy input image signal to generate a noisy horizontal/vertical high-spatial frequency image signal;

viii) converting the noisy horizontal/vertical high-spatial frequency image signal to a group of noisy horizontal/vertical high-spatial frequency image parallel signals associated with the locally considered pixel and according to the set of predetermined pixels-window characteristics;

ix) combining the noisy horizontal/vertical high-spatial frequency image parallel signals with the segmented local window parallel signals and the selected-pixels count signal to generate a resulting noise statistic signal associated with the locally considered pixel;

x) generating an input noise statistic signal from the resulting noise statistic signal; and xi) processing the noisy input image parallel signals with a minimum-mean-square-error filter using the segmented local window parallel signals, the selected-pixels count signal and the mean pixel value signal to generate a noise-filtered output image signal according to the input noise statistic signal.

27. A method according to claim 26, wherein values of said segmented local window parallel signals are given by:

$$w(i, j; x, y) = \begin{cases} 1, & \text{if } |g^*(i, j; x, y) - g^*(x, y)| < T \\ 0, & \text{elsewhere} \end{cases}$$

wherein:

$g^*(i,j;x,y)$ is said values of the noisy low-spatial frequency image parallel signals associated with pixels included within the window with $i=-k, \ldots, +l$; $j=-m, \ldots, +n$, said window having dimensions of $(k+l) \times (m+n)$, k,l,m,n being appropriate positive integers;

$g^*(x,y)$ is said locally considered pixel value; and

T is a predetermined threshold value.

28. A method according to claim 27, wherein a value of said mean pixel value signal is given by:

$$\mu(x,y) = (\Sigma\Sigma w(i,j;x,y) \cdot g(i,j;x,y))/N$$

with $$N = \Sigma\Sigma w(i,j;x,y)$$

wherein:

$g(i,j;x,y)$ are values of said group of noisy input image parallel signals;

N is a value of said selected-pixels count signal.

* * * * *